US011431695B2

(12) United States Patent
Tan et al.

(10) Patent No.: US 11,431,695 B2
(45) Date of Patent: Aug. 30, 2022

(54) AUTHORIZATION METHOD AND NETWORK ELEMENT

(71) Applicant: HUAWEI TECHNOLOGIES CO., LTD., Guangdong (CN)

(72) Inventors: Shuaishuai Tan, Shenzhen (CN); Lu Gan, Shenzhen (CN); Bo Zhang, Shenzhen (CN); Rong Wu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 210 days.

(21) Appl. No.: 16/814,018

(22) Filed: Mar. 10, 2020

(65) Prior Publication Data
US 2020/0213290 A1 Jul. 2, 2020

Related U.S. Application Data

(63) Continuation of application No. PCT/CN2018/089090, filed on May 30, 2018.

(30) Foreign Application Priority Data

Sep. 14, 2017 (CN) .......................... 201710825783.0

(51) Int. Cl.
*H04L 9/40* (2022.01)
*H04L 9/08* (2006.01)
(Continued)

(52) U.S. Cl.
CPC ............ *H04L 63/08* (2013.01); *H04L 9/0825* (2013.01); *H04L 9/30* (2013.01); *H04L 9/32* (2013.01);
(Continued)

(58) Field of Classification Search
CPC ..... H04L 63/0892; H04L 63/08; H04L 63/10; H04L 9/0825; H04L 9/30; H04L 9/32; H04W 12/06; H04W 12/08
See application file for complete search history.

(56) References Cited

U.S. PATENT DOCUMENTS 7,546,629 B2 * 6/2009 Albert ................. H04L 12/2856
709/223
10,003,459 B2 * 6/2018 Suzuki .................. H04L 9/3226
(Continued)

FOREIGN PATENT DOCUMENTS

CN 101383836 A 3/2009
CN 102210132 A 10/2011
(Continued)

OTHER PUBLICATIONS

M. Säily, C. Barjau, D. Navrátil, A. Prasad, D. Gómez-Barquero and F. B. Tesema, "5G Radio Access Networks: Enabling Efficient Point-to-Multipoint Transmissions," in IEEE Vehicular Technology Magazine, vol. 14, No. 4, pp. 29-37, Dec. 2019. (Year: 2019).*
(Continued)

*Primary Examiner* — Kari L Schmidt
(74) *Attorney, Agent, or Firm* — Womble Bond Dickinson (US) LLP

(57) ABSTRACT

An authorization method and a network element are disclosed, to implement a third-party authorization function based on a 5G service-based network architecture. The method is: receiving, by a resource control network element, a resource usage request message sent by a terminal device; replacing a first user identifier in the resource usage request message with a second user identifier; sending an authorization request message carrying the second user identifier to an authorization server by using an NEF; receiving, by using the NEF, an authorization response message sent by the authorization server, where the authorization response mes-
(Continued)

sage includes an authorization result that is obtained by performing authorization based on the second user identifier and the resource usage request message; and allocating a network resource to the terminal device based on the authorization result, and sending a resource allocation response message to the terminal device.

19 Claims, 15 Drawing Sheets

(51) Int. Cl.

| | | |
|---|---|---|
| H04L 9/30 | (2006.01) | |
| H04L 9/32 | (2006.01) | |
| H04L 47/70 | (2022.01) | |
| H04W 8/18 | (2009.01) | |
| H04W 12/06 | (2021.01) | |
| H04W 12/08 | (2021.01) | |
| H04W 12/0431 | (2021.01) | |

(52) U.S. Cl.
CPC ............. *H04L 47/70* (2013.01); *H04L 63/10* (2013.01); *H04W 8/18* (2013.01); *H04W 12/0431* (2021.01); *H04W 12/06* (2013.01); *H04W 12/08* (2013.01)

(56) References Cited

U.S. PATENT DOCUMENTS

| | | | | |
|---|---|---|---|---|
| 11,050,788 | B2* | 6/2021 | Livanos | H04W 8/12 |
| 11,115,805 | B2* | 9/2021 | Lee | H04W 4/40 |
| 2009/0138955 | A1* | 5/2009 | Vinayakray-Jani | H04W 12/0431 726/12 |
| 2011/0184901 | A1* | 7/2011 | Lommock | G06Q 10/10 706/47 |
| 2012/0036567 | A1* | 2/2012 | Senese | H04L 63/061 726/7 |
| 2012/0291113 | A1* | 11/2012 | Zapata | H04L 69/22 726/7 |
| 2014/0310529 | A1* | 10/2014 | Zong | H04W 12/069 713/176 |
| 2016/0028737 | A1* | 1/2016 | Srinivasan | H04L 63/102 726/1 |
| 2017/0048330 | A1 | 2/2017 | Montemurro et al. | |
| 2017/0105093 | A1 | 4/2017 | Qu et al. | |
| 2017/0332421 | A1* | 11/2017 | Sternberg | H04L 12/4641 |
| 2018/0206152 | A1* | 7/2018 | Zhang | H04W 72/12 |
| 2018/0270210 | A1* | 9/2018 | Gan | H04W 12/03 |
| 2018/0278595 | A1* | 9/2018 | Zhang | H04L 9/0822 |
| 2018/0302408 | A1* | 10/2018 | Touati | H04W 12/06 |
| 2019/0166493 | A1* | 5/2019 | You | H04W 12/037 |
| 2019/0199532 | A1* | 6/2019 | Zhang | H04L 9/3273 |
| 2019/0253894 | A1* | 8/2019 | Bykampadi | H04L 67/16 |
| 2020/0028921 | A1* | 1/2020 | Cai | H04L 63/102 |
| 2020/0112884 | A1* | 4/2020 | Kweon | H04W 28/18 |
| 2020/0177677 | A1* | 6/2020 | Yang | H04L 67/1097 |
| 2020/0367148 | A1* | 11/2020 | Baek | H04W 48/18 |
| 2021/0058748 | A1* | 2/2021 | Liao | H04L 12/189 |
| 2021/0304203 | A1* | 9/2021 | Kamamoto | G06Q 20/209 |
| 2021/0329460 | A1* | 10/2021 | Liao | H04L 63/20 |

FOREIGN PATENT DOCUMENTS

| | | |
|---|---|---|
| CN | 102638473 A | 8/2012 |
| CN | 102821085 B | 12/2015 |
| CN | 105376734 A | 3/2016 |
| CN | 105681259 A | 6/2016 |
| CN | 106713406 A | 5/2017 |
| CN | 105763547 B | 1/2019 |
| CN | 104917721 B | 5/2019 |

OTHER PUBLICATIONS

S. Behrad, E. Bertin and N. Crespi, "Securing authentication for mobile networks, a survey on 4G issues and 5G answers," 2018 21st Conference on Innovation in Clouds, Internet and Networks and Workshops (ICIN), 2018, pp. 1-8. (Year: 2018).*
R. Trivisonno, X. An and Q. Wei, "Network slicing for 5G systems: A review from an architecture and standardization perspective," 2017 IEEE Conference on Standards for Communications and Networking (CSCN), 2017, pp. 36-41,. (Year: 2017).*
Basin, David, et al. "A formal analysis of 5G authentication." Proceedings of the 2018 ACM SIGSAC conference on computer and communications security. 2018, pp. 1383-1396. (Year: 2018).*
3GPP TSG SA WG2 Meeting #122bis,S2-175780,TS 23.502: "AF influenced PDU session establishment and DNauthentication/ authorization via NEF",Huawei, HiSilicon,21 Au~ France,total 12 pages.
3GPP TS 23.502 V1.0.0:'3rd Generation Partnership Project;Technical Specification Group Services and System Aspects;Procedures for the 5G System;Stage 2(Release 15)', Sep. 2017, total 165 pages.
3GPP TR 33.899 V1.3.0:"3rd Generation Partnership Project;Technical Specification Group Services and System Aspects;Study on the security aspects of the next generation system(Release 14)",Aug. 2017.total 263 pages.
3GPP TS 33.501 V0.3.0:"3rd Generation Partnership Project;Technical Specification Group Services and System Aspects;Security Architecture and Procedures for 5G System (Release 15)",Aug. 2017,total 44 pages.

* cited by examiner

AUTHORIZATION METHOD AND NETWORK ELEMENT

CROSS-REFERENCE TO RELATED APPLICATIONS

This application is a continuation of International Application No. PCT/CN2018/089090, filed on May 30, 2018, which claims priority to Chinese Patent Application No. 201710825783.0, filed on Sep. 14, 2017. The disclosures of the aforementioned applications are hereby incorporated by reference in their entireties.

TECHNICAL FIELD

This application relates to the field of communications technologies, and in particular, to an authorization method and a network element.

BACKGROUND

Currently, compared with a 3rd generation partnership project (3GPP) 2G/3G/4G network architecture, a new 5G service-based network architecture is proposed in 3GPP.

5G provides network infrastructure for internet of things, and devices are interconnected by accessing 5G. In a 5G era, the network provides a capability exposure function, so that a network service and management function is exposed to a third party, and the third party can participate in network management by authorizing whether to allow a terminal device to use a network resource.

Although a third-party authorization function is implemented in a secondary authentication procedure in the current 3GPP standard document TS 33.501, the current third-party authorization function is not designed based on a service-based network architecture, but the service-based network architecture is a unique 5G implementation architecture. Therefore, a technical solution to third-party authorization needs to be designed for the 5G service-based network architecture.

SUMMARY

Embodiments of this application provide an authorization method and a network element, to implement a third-party authorization function based on a 5G service-based network architecture.

Specific technical solutions provided in the embodiments of this application are as follows:

According to a first aspect, an embodiment of this application provides a third-party authorization method, including: receiving, by a resource control network element, a resource usage request message sent by a terminal device, where the resource usage request message includes a first user identifier of the terminal device; replacing, by the resource control network element, the first user identifier with a second user identifier, and sending an authorization request message carrying a second user identifier to a network exposure function NEF; sending, by the NEF, the authorization request message to an authorization server, when determining that the authorization request message meets a preset security requirement; querying, by the authorization server based on locally stored authorization information of the terminal device, an authorization result corresponding to the second user identifier and the authorization request message, adding the authorization result to an authorization response message, and sending the authorization response message to the NEF; sending, by the NEF, the authorization response message to the resource control network element, when determining that the authorization response message meets the preset security requirement; and allocating, by the resource control network element, a network resource to the terminal device based on the authorization result in the authorization response message, and sending a resource allocation response message to the terminal device.

In the foregoing method, after receiving the resource usage request message sent by the terminal device, the resource control network element replaces the first user identifier in the resource usage request message with the second user identifier, and sends, by using the NEF, the authorization request message carrying the second user identifier to the authorization server. After receiving the authorization request message, the authorization server trusts an identity authentication result of the terminal device in a network in which the resource control network element is located, so that an operation of repeated identity authentication on the terminal device is avoided, and message overheads are reduced. Considering a 5G service-based network structure, the foregoing method can meet a requirement of the 5G service-based network architecture on third-party authorization.

In addition, after receiving a message sent by the resource control network element or the authorization server, the network exposure function performs security check on the received information, and securely forwards the information to a corresponding network element, thereby protecting a service-layer security gateway.

In one embodiment, the replacing, by the resource control network element, the first user identifier with a second user identifier may be implemented in the following processes: performing, by the resource control network element, identity verification on the first user identifier, and after determining that the identity verification on the first user identifier succeeds, replacing the first user identifier with the second user identifier.

In one embodiment, after the resource control network element performs identity verification on the terminal device by using the first user identifier, and after the identity authentication succeeds, the resource control network element replaces the first user identifier with the second user identifier.

In one embodiment, the performing, by the resource control network element, identity verification on the first user identifier may be implemented in the following manner: determining, by the resource control network element, that the identity verification on the first user identifier succeeds, when determining that the first user identifier is a subscriber permanent identifier, a subscriber temporary identity, or a third-party user identifier.

In one embodiment, the second user identifier is an encrypted first user identifier.

In one embodiment, before replacing the first user identifier with the second user identifier, the resource control network element may obtain the second user identifier in the following manners:

Manner 1: Generate the second user identifier by encrypting a public key of the resource control network element, the first user identifier, and a preset parameter by using an asymmetric encryption algorithm.

Manner 2: Generate the second user identifier by encrypting a public key of the resource control network element, the first user identifier, and a preset parameter by using a symmetric encryption algorithm.

Manner 3: Generate the second user identifier by encrypting the first user identifier and a preset parameter by using a hash encryption algorithm.

Manner 4: Generate the second user identifier by encrypting a nonce of the resource control network element, the first user identifier, and a preset parameter by using a hash encryption algorithm.

In one embodiment, when obtaining the second user identifier by encrypting the first user identifier in the foregoing manners, and sending the authorization request message carrying the second user identifier to the authorization server, the resource control network element can not only notify the authorization server of the identity of the terminal device that has been authenticated, but also avoid user privacy leakage.

In one embodiment, before the replacing, by the resource control network element, the first user identifier with a second user identifier, the method further includes: calculating the second user identifier by using the encrypted first user identifier, a preset variable factor, and a preset encryption algorithm, where the encrypted first user identifier may be obtained in the foregoing manners.

In one embodiment, when obtaining the second user identifier by encrypting the encrypted first identifier again in the preset algorithm, and sending the authorization request message carrying the second user identifier to the authorization server, the resource control network element can not only notify the authorization server of the identity of the terminal device that has been authenticated, but also avoid user privacy leakage.

In one embodiment, the authorization request message further includes an application identifier, and the authorization response message includes the authorization result that is obtained by the authorization server by performing authorization based on the second user identifier, the application identifier, and the resource usage request message.

In one embodiment, because the authorization request message includes the application identifier, the authorization server may perform third-party authorization on a specific application of the terminal device, thereby implementing an application-level fine-grained authorization function.

In one embodiment, the authorization response message further includes the second user identifier.

In one embodiment, the authorization request message further includes a first message authentication code, and the first message authentication code is used by the authorization server to verify security of the authorization request message; and the authorization request message and the authorization response message further include a second message authentication code, and the second message authentication code is used by the resource control network element to verify security of the authorization response message.

In one embodiment, because the authorization request message and the authorization response message include the message authentication codes, the security of the message can be improved, and an anti-replay capability of the message can be enhanced.

In one embodiment, after the receiving, by the resource control network element by using the NEF, an authorization response message sent by the authorization server, the method further includes: sending, by the resource control network element, an authorization acknowledgment message to the authorization server by using the NEF, where the authorization acknowledgment message includes a third message authentication code, and the third message authentication code is used by the authorization server to verify security of the authorization acknowledgment message.

In one embodiment, the resource control network element feeds back, to the authorization server by using the authorization acknowledgment message, whether the authorization response message is successfully received, to ensure that a third-party authorization process can be completely performed. Because the authorization acknowledgment message includes the message authentication code, the security of the message can be improved, and an anti-replay capability of the message can be enhanced.

In one embodiment, before the sending, by the resource control network element, an authorization request message to an authorization server, the method further includes: receiving, by the resource control network element, a subscription data response message of the terminal device, where the subscription data response message includes third-party authorization indication information, and the third-party authorization indication information is used to indicate that third-party authorization needs to be performed on the terminal device; or determining, by the resource control network element according to a local configuration policy, that third-party authorization needs to be performed on the terminal device.

In one embodiment, if the resource control network element stores the third-party authorization information of the terminal device, the third-party authorization indication information can be obtained in the foregoing process.

In one embodiment, the resource usage request message is a session setup request message or a registration request message.

In one embodiment, the allocating, by the resource control network element, a network resource to the terminal device based on the authorization result includes: if the authorization result is that the terminal device is allowed to use a network resource, allocating, by the resource control network element, a requested network resource to the terminal device; or if the authorization result is that the terminal device is not allowed to use a network resource, refusing, by the resource control network element, to allocate a requested network resource to the terminal device.

In one embodiment, the determining, by the NEF, that the authorization request message meets a preset security requirement may include the following processes: determining, by the NEF, that the resource control network element is allowed to send the authorization request message; and/or determining that message content of the authorization request message meets a preset security policy.

In the above-designed security check manner of the authorization request message, it is ensured that security of a received message can be effectively authenticated, and message can be securely forwarded.

In one embodiment, the determining, by the NEF, that the authorization response message meets the preset security requirement may include the following processes: determining, by the NEF, that the authorization response message sent by the authorization server is allowed to be received; determining that message content of the authorization response message meets a preset security policy; and/or determining that a destination address of the authorization response message is consistent with a source address of the authorization request message.

In the above-designed security check manner of the message, it is ensured that security of a received message can be effectively authenticated, and message can be securely forwarded. In addition, it can be ensured that the message address of the authorization response message is consistent with the source address of the authorization request message, thereby improving security and reliability of the third-party authorization.

According to a second aspect, an embodiment of this application provides a resource control network element, including: a receiving unit, configured to receive a resource usage request message sent by a terminal device, where the resource usage request message includes a first user identifier of the terminal device; a processing unit, configured to replace the first user identifier with a second user identifier; and a sending unit, configured to send an authorization request message to an authorization server by using a network exposure function NEF, where the authorization request message includes the second user identifier of the terminal device, where the receiving unit is further configured to receive, by using the NEF, an authorization response message sent by the authorization server, where the authorization response message includes an authorization result that is obtained by the authorization server by performing authorization based on the second user identifier and the resource usage request message; the processing unit is further configured to allocate a network resource to the terminal device based on the authorization result; and the sending unit is further configured to send a resource allocation response message to the terminal device.

In one embodiment, when replacing the first user identifier with the second user identifier, the processing unit is specifically configured to:

perform identity verification on the first user identifier, and after determining that the identity verification on the first user identifier succeeds, replace the first user identifier with the second user identifier.

In one embodiment, when performing the identity verification on the first user identifier, the processing unit is specifically configured to:

determine that the identity verification on the first user identifier succeeds, when determining that the first user identifier is a subscriber permanent identifier, a subscriber temporary identity, or a third-party user identifier.

In one embodiment, the second user identifier is an encrypted first user identifier.

In one embodiment, before replacing the first user identifier with the second user identifier, the processing unit is further configured to: generate the second user identifier by encrypting a public key of the resource control network element, the first user identifier, and a preset parameter by using an asymmetric encryption algorithm; generate the second user identifier by encrypting a public key of the resource control network element, the first user identifier, and a preset parameter by using a symmetric encryption algorithm; generate the second user identifier by encrypting the first user identifier and a preset parameter by using a hash encryption algorithm; or generate the second user identifier by encrypting a nonce of the resource control network element, the first user identifier, and a preset parameter by using a hash encryption algorithm.

In one embodiment, before replacing the first user identifier with the second user identifier, the processing unit is further configured to: calculate the second user identifier by using the encrypted first user identifier, a preset variable factor, and a preset encryption algorithm; and the encrypted first user identifier is generated by: encrypting a public key of the resource control network element, the first user identifier, and a preset parameter by using an asymmetric encryption algorithm; encrypting a public key of the resource control network element, the first user identifier, and a preset parameter by using a symmetric encryption algorithm; encrypting the first user identifier and a preset parameter by using a hash encryption algorithm; or encrypting a nonce of the resource control network element, the first user identifier, and a preset parameter by using a hash encryption algorithm.

In one embodiment, the authorization request message further includes an application identifier, and the authorization response message includes the authorization result that is obtained by the authorization server by performing authorization based on the second user identifier, the application identifier, and the resource usage request message.

In one embodiment, the authorization response message further includes the second user identifier.

In one embodiment, the authorization request message further includes a first message authentication code, and the first message authentication code is used by the authorization server to verify security of the authorization request message; and the authorization response message further includes a second message authentication code, and the second message authentication code is used by the processing unit to verify security of the authorization response message.

In one embodiment, after the receiving unit receives, by using the NEF, the authorization response message sent by the authorization server, the sending unit is further configured to: send an authorization acknowledgment message to the authorization server by using the NEF, where the authorization acknowledgment message includes a third message authentication code, and the third message authentication code is used by the authorization server to verify security of the third-party authorization acknowledgment message.

In one embodiment, before the sending unit sends the authorization request message to the authorization server, the receiving unit is further configured to: receive a subscription data response message of the terminal device, where the subscription data response message includes third-party authorization indication information, and the third-party authorization indication information is used to indicate that third-party authorization needs to be performed on the terminal device; or the processing unit is further configured to determine, according to a local configuration policy, that third-party authorization needs to be performed on the terminal device.

In one embodiment, the resource usage request message is a session setup request message or a registration request message.

In one embodiment, when allocating a network resource to the terminal device based on the authorization result, the processing unit is specifically configured to: if the authorization result is that the terminal device is allowed to use a network resource, allocate a requested network resource to the terminal device; or if the authorization result is that the terminal device is not allowed to use a network resource, refuse to allocate a requested network resource to the terminal device.

According to another aspect, a physical device corresponding to the processing unit in the foregoing embodiment may be a processor, a physical device corresponding to the receiving unit may be a receiver, and a physical device corresponding to the sending unit may be a transmitter.

According to a third aspect, an embodiment of this application provides a resource exposure function NEF, including: a receiving unit, configured to receive an authorization request message sent by a resource control network element, where the authorization request message includes a second user identifier of the terminal device; a processing unit, configured to determine that the authorization request message meets a preset security requirement; and a sending unit, configured to send the authorization request message to an authorization server, where the receiving unit is further configured to receive an authorization response message that is fed back by the authorization server based on the authorization request message; the processing unit is further configured to determine that the authorization response message meets the preset security requirement; and the sending unit is further configured to send the authorization response message to the resource control network element.

In one embodiment, when determining that the authorization request message meets the preset security requirement, the processing unit is specifically configured to: determine that the resource control network element is allowed to send the authorization request message; and/or determine that message content of the authorization request message meets a preset security policy.

In one embodiment, when determining that the authorization response message meets the preset security requirement, the processing unit is specifically configured to: determine that the authorization server is allowed to send the authorization response message; determine that message content of the authorization response message meets a preset security policy; and/or determine that a destination address of the authorization response message is consistent with a source address of the authorization request message.

According to another aspect, a physical device corresponding to the processing unit in the foregoing embodiment may be a processor, a physical device corresponding to the receiving unit may be a receiver, and a physical device corresponding to the sending unit may be a transmitter.

According to a fourth aspect, an embodiment of this application provides an authorization server, including: a receiving unit, configured to receive an authorization request message sent by a network exposure function NEF, where the authorization request message includes a subscriber permanent identifier of a terminal device; a processing unit, configured to query, based on locally stored authorization information of the terminal device, an authorization result corresponding to the second user identifier; and a sending unit, configured to send an authorization response message to the resource control network element by using the NEF, where the authorization response message includes the authorization result.

In one embodiment, the authorization request message further includes an application identifier, and the authorization response message further includes the application identifier; and when querying, based on the locally stored authorization information of the terminal device, the authorization result corresponding to the subscriber permanent identifier, the processing unit is specifically configured to: query, based on the locally stored authorization information of the terminal device, the authorization result corresponding to the second user identifier and the application identifier.

According to another aspect, a physical device corresponding to the processing unit in the foregoing embodiment may be a processor, a physical device corresponding to the receiving unit may be a receiver, and a physical device corresponding to the sending unit may be a transmitter.

According to a fourth aspect, an embodiment of this application provides a system for authorization, including:

a resource control network element, configured to: receive a resource usage request message sent by a terminal device, where the resource usage request message includes a first identifier of the terminal device, replace the first user identifier with a second user identifier, and send an authorization request message to an authorization server by using a network exposure function NEF, where the authorization request message includes the second user identifier of the terminal device; receive, by using the NEF, an authorization response message sent by the authorization server, where the authorization response message includes an authorization result that is obtained by the authorization server by performing authorization based on the second user identifier and the resource usage request message; and allocate a network resource to the terminal device based on the authorization result, and send a resource allocation response message to the terminal device; and an NEF, configured to: receive the authorization request message sent by the resource control network element; and send the authorization request message to the authorization server, when determining that the authorization request message meets a preset security requirement; receive an authorization response message that is fed back by the authorization server based on the authorization request message; and send the authorization response message to the resource control network element, when determining that the authorization response message meets the preset security requirement; and the authorization server, configured to: receive the authorization request message sent by the NEF, and query, based on locally stored authorization information of the terminal device, an authorization result corresponding to the second user identifier; and send the authorization response message to the resource control network element by using the NEF, where the authorization response message includes the authorization result.

According to a fifth aspect, an embodiment of this application provides a computer-readable storage medium. The computer-readable storage medium stores an instruction. When the instruction is run on a computer, the computer is enabled to perform the methods in the foregoing aspects.

According to a sixth aspect, an embodiment of this application provides a computer program product including an instruction. When the computer program product is run on a computer, the computer is enabled to perform the methods in the foregoing aspects.

According to a seventh aspect, an embodiment of this application provides a chip system. The chip system includes a processor, configured to support a resource control network element in implementing the function in the first aspect. In one embodiment, the chip system further includes a memory, where the memory is configured to store a program instruction and data that are necessary for the resource control network element. The chip system may include a chip, or may include a chip and another discrete device.

According to an eighth aspect, an embodiment of this application provides a chip system. The chip system includes a processor, configured to support a network exposure function in implementing the function in the first aspect. In one embodiment, the chip system further includes a memory, where the memory is configured to store a program instruction and data that are necessary for the network exposure function. The chip system may include a chip, or may include a chip and another discrete device.

According to a ninth aspect, an embodiment of this application provides a chip system. The chip system includes a processor, configured to support an authorization server in implementing the function in the first aspect. In one embodiment, the chip system further includes a memory, where the memory is configured to store a program instruction and data that are necessary for the authorization server. The chip system may include a chip, or may include a chip and another discrete device.

It should be understood that, technical solutions in the second to the ninth aspects of the embodiments of this application are consistent with that in the first aspect of the embodiments of this application, and beneficial effects achieved by these aspects and the corresponding implementable design manners are similar. Details are not described again.

DESCRIPTION OF EMBODIMENTS

The following clearly and completely describes the technical solutions in the embodiments of this application with reference to the accompanying drawings in the embodiments of this application.

A 5G service-based network architecture means that a function of a network element is abstracted into a plurality of services. In addition to a network element in a conventional architecture, two network elements: a network exposure function (NEF) and a network repository function (NRF)) are newly added in the 5G service-based architecture. The NEF can securely provide a 3GPP network element service and capability to an external party, and may be considered as a security gateway. If the external party world needs to invoke a function of an internal network, the NEF needs to be used as an intermediate network element, to avoid a security problem caused due to direct exposure of the internal network element. The external party herein may be a third party other than an operator network, an application network element (Application Function, AF), an edge computing network element, and the like.

Figure 1:
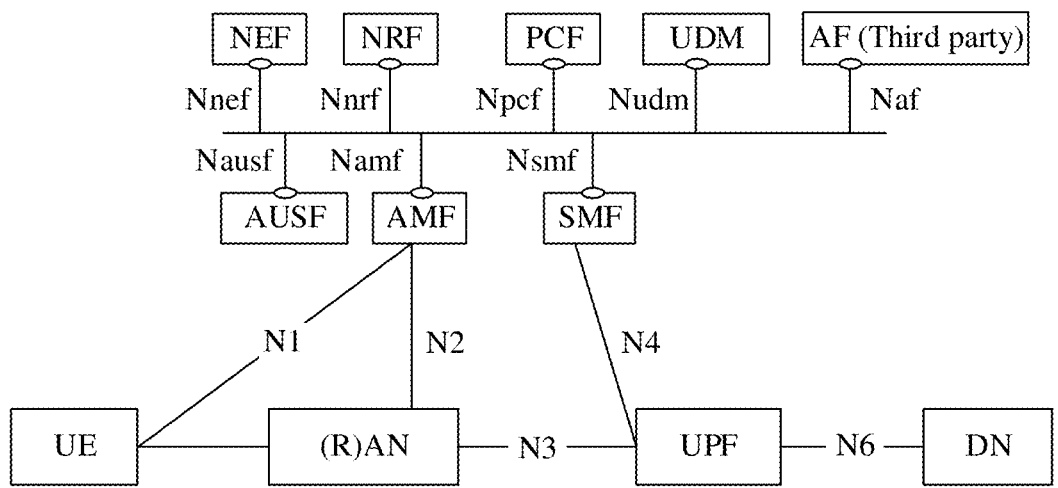
FIG. 1 is a schematic diagram of a 5G service-based network architecture.

The technical solutions provided in the embodiments of this application are applicable to the 5G service-based network architecture. FIG. 1 is a schematic diagram of a 5G service-based network architecture. FIG. 1 includes network elements included in the 5G service-based network architecture, and interfaces used for communication between the network elements.

For the 5G service-based network architecture, the embodiments of this application provide an authorization method and a network element, to implement a third-party authorization function based on the 5G service-based network architecture. The method and the network element are based on a same inventive concept. Because problem resolving principles of the method and the network element are similar, for implementation of the network element and the method, mutual reference may be made, and details are not repeated.

Network elements in the embodiments of this application mainly include a terminal device, a unified data management network element (UDM), a session management function (SMF), a network exposure function (NEF), an NRF, an access and mobility management function (AMF), an AF, a user plane function (UPF), and a policy control function (PCF).

The terminal device is user equipment that can access a network, and may also be referred to as user equipment (UE). For example, the terminal device may be an intelligent terminal device such as a mobile phone or a tablet computer. For another example, the terminal device may be a communications device such as a server, a gateway, a base station, or a controller. For still another example, the terminal device may be an internet of things device such as a sensor, an electricity meter, or a water meter.

The UDM uses subscription data and authentication data that are stored in a user data repository network element (UDR). Generally, the UDR and the UDM are configured in an integrated manner. In this application, when the UDM is used, it is considered by default that the UDM includes a function of the UDR.

The SMF is configured to control related signaling in a process of setting up, deleting, or modifying a session for the terminal device.

The NEF securely exposes, to the third party, the AF, and the like, a service provided by another NF in a network, securely transfers, to the network, information sent by the AF, and acts as a service-layer security gateway. Methods for ensuring security by the NEF include performing authentication, performing authorization and adjusting AF traffic, checking whether service invoking complies with a policy, and the like.

The NRF stores and maintains NF information in a network, and provides an NF discovery function, that is, may request information about an NF, such as an IP address, from the NRF.

The AMF is responsible for registration management, accessibility management, mobility management, and the like of the terminal device.

The AF is a network element that provides an application, and an authorization server may be deployed as the AF.

The UPF may also be referred to as a data plane gateway, for example, an egress gateway. User data is connected to a data network (DN) by using the network element. The UPF may be an Internet service server, a service server of a third-party, or the like.

The PCF is used to obtain, negotiate, and decide a security policy. Specifically, the PCF may be used to select a security protection algorithm. For example, based on a security capability list of a terminal device and a network-side security algorithm list that is obtained or stored in advance, the PCF obtains an intersection set and sorts priorities to select security algorithms to be finally used, which includes an encryption algorithm and an integrity protection algorithm.

The following describes the embodiments of this application in detail with reference to the accompanying drawings. It should be noted that a presentation sequence of the embodiments of this application represents only a sequence of the embodiments, and does not represent priorities of the technical solutions provided in the embodiments.

Figure 2:
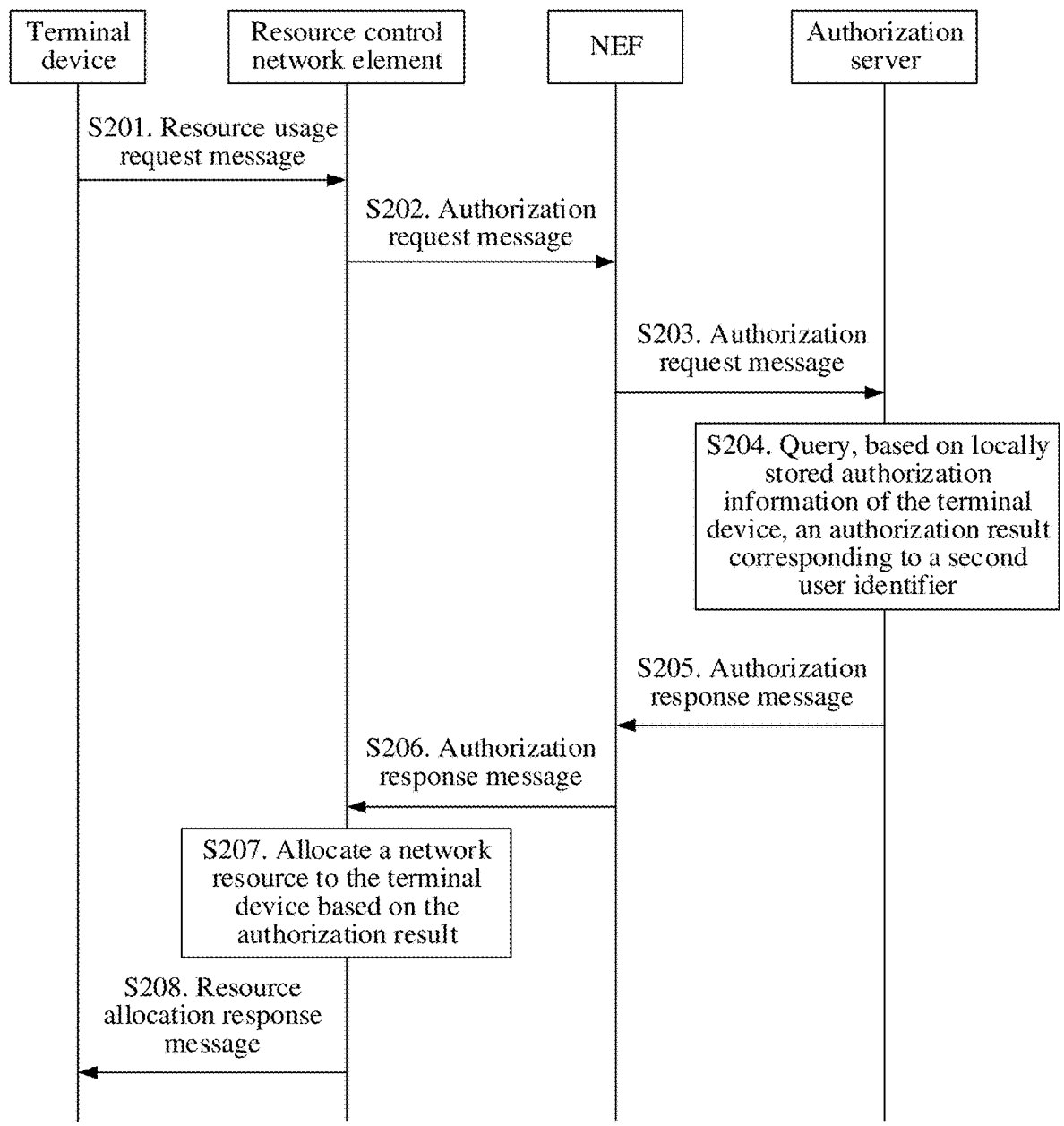
FIG. 2 is a schematic flowchart of an authorization method according to an embodiment of this application.

As shown in FIG. 2, an embodiment of this application provides a procedure of a third-party authorization method. Network elements in the method include a resource control network element, an NEF, and an authorization server. The resource control network element is a network element that can control allocation of a network resource or provide a network resource, including but not limited to an SMF, an AMF, a RAN, and a UPF. The authorization server is a server that can authorize a terminal device to use a network resource, and may be a third-party authorization server, including but not limited to an AF, a DN, or a DN-AAA, or may be an authorization server in a network in which the resource control network element is located. Some or all functions of the NEF in the authorization procedure may alternatively be completed by a PCF or a UPF. A procedure of interaction between the network elements is as follows:

S201: The resource control network element receives a resource usage request message sent by a terminal device, where the resource usage request message includes a first user identifier of the terminal device.

The resource usage request message is a session setup request message or a registration request message.

In one embodiment, before performing operation S202, the resource control network element performs identity verification on the first user identifier, and after determining that the identity verification on the first user identifier succeeds, replaces the first user identifier with a second user identifier. Specifically, the resource control network element determines that the identity verification on the first user identifier succeeds, when determining that the first user identifier is a subscriber permanent identifier, a subscriber temporary identity, or a third-party user identifier.

In one embodiment, the resource control network element does not perform identity authentication on the terminal device. After receiving the resource usage request message including the first user identifier, it is considered by default that the identity verification has been performed on the terminal device in a network in which the resource control network element is located.

The first user identifier in this application may be a subscriber permanent identifier, a subscriber temporary identity, or a third-party user identifier.

The third-party user identifier is an identifier allocated by a third party to the terminal device, for example, a network access identifier (NAI). A third party refers to a third-party information service provider other than a user and an operator. If the third-party user identifier is represented by an NAI, the third-party user identifier can indicate a domain name of the authorization server. For example, a format of the NAI is username@server.com, and an address of the authorization server refers to a domain name of the server, for example, server.com. Therefore, the NAI includes the address of the authorization server.

In one embodiment, the resource usage request message further includes at least one of the address of the authorization server and an application identifier. The address of the authorization server includes but is not limited to a data network name (DNN), an access point name (APN), and an internet protocol (IP) address. The application identifier is used to distinguish between a plurality of applications on the terminal device, and includes but is not limited to an application identifier (APP ID) and a port number.

In one embodiment, the resource usage request message may include the first user identifier of the terminal device, for example, a subscriber permanent identifier (SUPI), or may include at least one of a 5G globally unique temporary UE identity (5G-GUTI), a GUTI, and a temporary mobile subscriber identity (TMSI). If the resource usage request message does not include the subscriber permanent identifier, the resource control network element may obtain the subscriber permanent identifier of the terminal device based on the 5G-GUTI, the GUTI, or the TMSI. In this case, the resource control network element pre-stores a correspondence between the 5G-GUTI, the GUTI, or the TMSI and the subscriber permanent identifier.

S202: The resource control network element replaces the first user identifier with the second user identifier, and sends an authorization request message to an NEF, where the authorization request message includes the second user identifier.

It should be noted that the second user identifier of the terminal device is an encrypted first user identifier.

It should be noted that, if the resource control network element does not locally store subscription data of the terminal device that is related to third-party authorization, in other words, the resource control network element does not store related information of the second user identifier of the terminal device, the resource control network element sends, to a UDM, a subscription request used to request subscription data of a user. The resource control network element receives a subscription data response message returned by the UDM, where the subscription data response message includes the second user identifier. In one embodiment, the subscription data response message may further include at least one of authorization indication information indicating whether third-party authorization is required, and the address of the authorization server.

It should be noted that the second user identifier in this embodiment of this application may be an encrypted subscriber permanent identifier, which is represented by an SUPI* in this embodiment of this application; or may be an identifier obtained by encrypting the SUPI* by using a variable factor (salt), and is represented by an SUPI**.

The subscriber permanent identifier is represented by an SUPI and includes but is not limited to an international mobile subscriber identity (IMSI), an international mobile equipment identity (IMEI), an IP address, or an NAI.

The SUPI* is calculated by using, including but not limited to, the following methods:

(1) SUPI*=E(PUCN, SUPI, Para), where PUCN is a public key held by the resource control network element, and E is an asymmetric encryption algorithm.

(2) SUPI*=E(KCN, SUPI, Para), where KCN is a key held by the resource control network element, and E is a symmetric encryption algorithm.

(3) SUPI*=Hash(SUPI, Para), where Hash is a hash encryption algorithm.

The parameter Para includes but is not limited to a nonce, a value on a counter, a character string, an operator identifier, a service network identifier, and an application identifier.

It should be noted that when the second user identifier is the SUPI*, the UDM stores a correspondence between the SUPI and the SUPI* that are of the terminal device. Specifically, Table 1 provides an example for illustration.

TABLE 1

| SUPI | SUPI* |
|---|---|
| 123456789012345 | 08227a870de5e2258c56b3ce0f629502e5d4fb71 |

Before sending the authorization request message to the NEF, the resource control network element has obtained the address of the authorization server through domain name system (DNS) query. In one embodiment, the address of the authorization server may alternatively be included in the authorization request message, and the NEF completes DNS query.

In one embodiment, the authorization request message further includes related information of a network resource requested by the terminal device.

S203: The NEF sends the authorization request message to the authorization server, when determining that the authorization request message meets a preset security requirement.

Specifically, the NEF performs security check on the authorization request message to determine whether the message meets the preset security requirement. Check content includes but is not limited to: whether the resource control network element is allowed to send the message, whether the resource control network element is allowed to invoke a service of the authorization server, and whether content of the message requested in the third-party authorization meets a preset security policy.

S204: The authorization server queries, based on locally stored authorization information of the terminal device, an authorization result corresponding to the second user identifier.

S205: The authorization server sends an authorization response message to the NEF.

Specifically, after receiving the authorization request message, the authorization server checks whether the stored authorization information includes an authorization record corresponding to the second user identifier. The authorization record is a group of data indexed by the second user identifier, and the group of data includes but is not limited to the second user identifier, a third-party identifier, an application identifier, permission, salt, and extra data. Table 1 is an example of the authorization record, and the extra data is reserved for use. An example in which the second user identifier is an SUPI* is used for description. If there is an authorization record corresponding to the SUPI*, it indicates that an identity of a terminal device that owns the SUPI* has been authenticated in the network in which the resource control network element is located, and the authorization server trusts the authentication result. Then, the authorization server queries permission corresponding to the SUPI*. If the authorization request message includes an application identifier, the authorization server should query for permission corresponding to the application identifier. The authorization server sends the authorization response message to the NEF. The authorization response message includes the authorization result, and in one embodiment, may further include an SUPI* and an application identifier. The authorization result includes but is not limited to permission and extra data.

TABLE 1

| Third-party identifier (NAI) | SUPI* | [Application identifier] | Permission | Extra data |
|---|---|---|---|---|
| watermeter32234237@smart.com | 08227a870de5e2258c56b3ce0f629502e5d4fb71 | 8021<br>8022<br>8023 | Allowed<br>Not allowed<br>Allowed | |
| watermeter32234790@smart.com | 429f75a98a2f48bd7f0c71606b4795f67843df13 | 8021<br>8022 | Allowed<br>Not allowed | |

S206: The NEF sends the authorization response message to the resource control network element when determining that the authorization response message meets the preset security requirement.

Specifically, the NEF performs security check on the authorization response message to determine whether the authorization response message meets the preset security requirement. Check content includes but is not limited to: source and integrity authentication on a third-party authorization message, whether a destination address of the message is an address of the resource control network element that previously sends the authorization request message, and whether message content meets the preset security policy.

S207: The resource control network element allocates a network resource to the terminal device based on the authorization result.

S208: The resource control network element sends a resource allocation response message to the terminal device, where the resource allocation response message includes indication information indicating whether a requested network resource is allocated to the terminal device.

Specifically, if the authorization result is that the terminal device is allowed to use a network resource, the resource control network element allocates a requested network resource to the terminal device; or if the authorization result is that the terminal device is not allowed to use a network resource, the resource control network element refuses to allocate a requested network resource to the terminal device.

According to the third-party authorization method shown in FIG. 2, after receiving the authorization request message, the authorization server trusts the result of identity authentication performed on the terminal device in the network in which the resource control network element is located, so that an operation of repeated identity authentication on the terminal device is omitted, and message overheads are reduced. Considering a 5G service-based network structure, the method shown in FIG. 2 can meet a requirement of the 5G service-based network architecture on third-party authorization.

Based on the third-party authorization method shown in FIG. 2, the method is appropriately extended and modified in the embodiments. The following provides descriptions by using examples.

Embodiment 1

Figure 3:
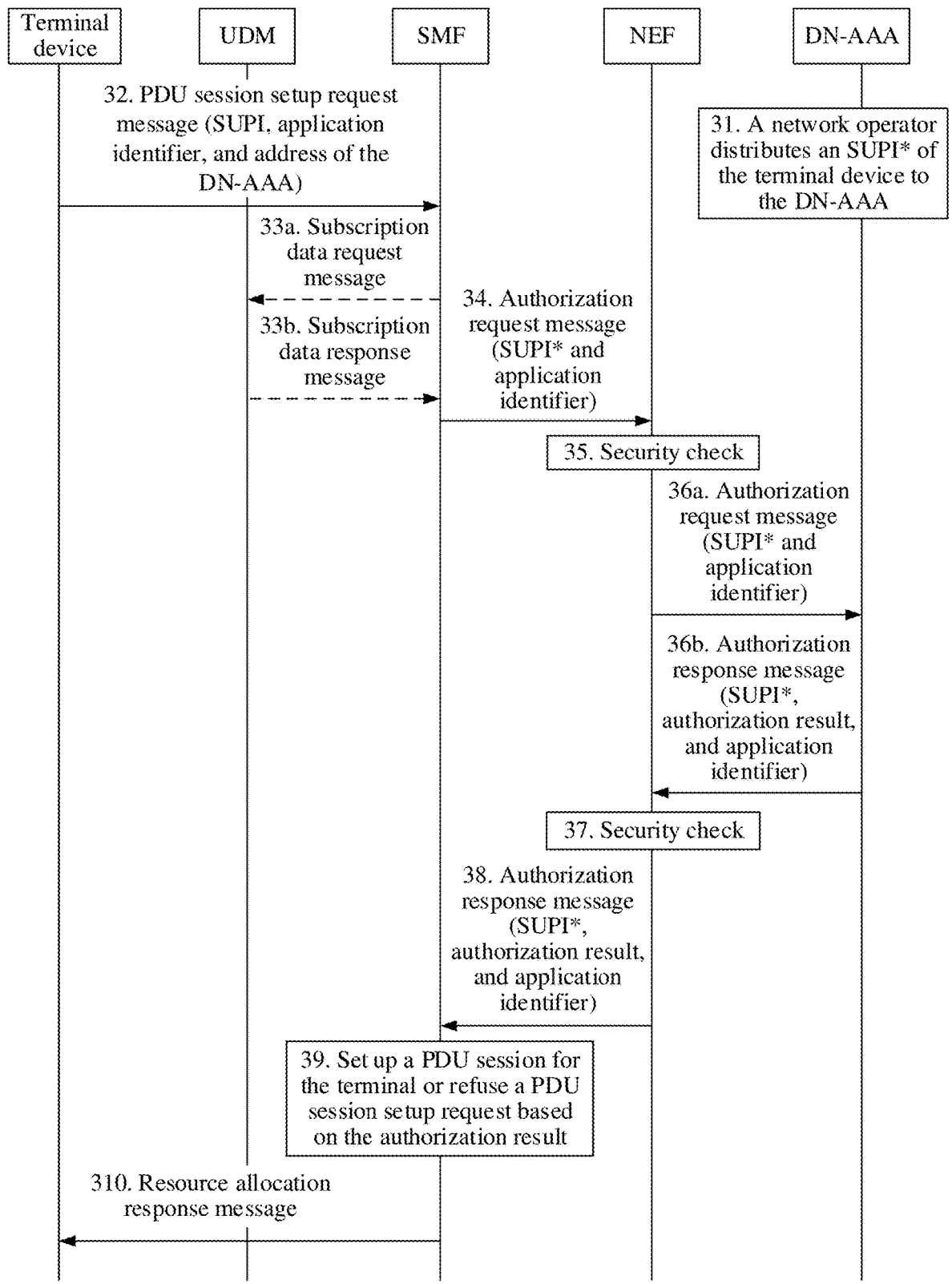
FIG. 3 to FIG. 12 are flowcharts of authorization methods provided in examples in Embodiment 1 to Embodiment 10 of this application.

FIG. 3 is a schematic flowchart of a third-party authorization method according to this embodiment. In the method procedure shown in FIG. 3, the third-party authorization solution is applied to a procedure in which an SMF sets up a PDU session for a terminal device. In this case, a resource control network element is the SMF, an authorization server is a DN-AAA, a resource usage request is a PDU session setup request, and a subscriber permanent identifier is an SUPI. Specifically, specific signaling exchange is shown in FIG. 3, and operations are as follows:

Operation 31: A network operator distributes an SUPI* of the terminal device to the DN-AAA, in other words, notifies the DN-AAA of the SUPI* corresponding to the terminal device, where the DN-AAA stores a correspondence between the terminal device and the SUPI*. The DN-AAA implements a function of the authorization server, and the network operator is an entity that lawfully controls a UDM, the SMF, and an NEF.

Operation 32: The terminal device sends a PDU session setup request message to the SMF, where the PDU session setup request message needs to be forwarded by an AMF (not shown), the PDU session setup request message is included in N1 SM information of an NAS message sent from the UE to the AMF, and then the AMF sends the NAS message to the SMF. The PDU session request setup message includes a third-party identifier of the terminal device, an application identifier, and an address of the DN-AAA.

In one embodiment, if the SMF has no subscription data of the UE that is related to third-party authorization, the SMF further needs to perform the following operations:

Operation 33a: The SMF sends a subscription data request message to the UDM.

Operation 33b: The UDM returns a subscription data response message to the SMF, where the subscription data response message includes the SUPI* and authorization indication information indicating whether the third-party authorization is required.

In one embodiment, the SMF receives the subscription data response message, and if the authorization indication information in the subscription data response message indicates that PDU session setup requires the third-party authorization, the SMF performs operation 34.

In one embodiment, the SMF determines, based on a local configuration policy, that the PDU session setup requires the third-party authorization, and the SMF performs operation 34.

Operation 34: The SMF sends an authorization request message to the NEF, where the authorization request message includes the SUPI* and the application identifier.

Specifically, the SMF obtains the SUPI* by encrypting an SUPI included in the PDU session request setup message.

Operation 35: The NEF performs security check on the authorization request message, and determines that the authorization request message meets a preset security requirement.

Specifically, security check content includes but is not limited to: whether the SMF is allowed to send the authorization request message to the DN-AAA, and whether message content of the authorization request message meets a preset security policy.

Operation 36a: The NEF forwards the authorization request message received in operation 34 to the DN-AAA.

Operation 36b: The DN-AAA obtains through query, authorization information corresponding to the third-party authorization request, uses the authorization information as an authorization result, and returns an authorization response message to the NEF, where the authorization response message includes the SUPI*, the authorization result, and the application identifier.

Operation 37: The NEF performs security check on the authorization response message in operation 36b, where check content includes but is not limited to: source and integrity authentication on the authorization response message, whether a destination address of the message is an address of the SMF that previously sends the authorization request message, and whether message content meets the preset security policy.

Operation 38: The NEF determines that the security check on the authorization response message succeeds, and forwards the authorization response message to the SMF, where the authorization response message includes the authorization result, the SUPI*, and the application identifier.

Operation 39: The SMF allocates a network resource to the terminal device based on the authorization result. Specifically, if the authorization result indicates that it is allowed to set up a PDU session for the terminal device, the PDU session setup procedure continues to be performed. If the authorization result indicates that it is not allowed to set up a PDU session for the terminal device, the SMF terminates the PDU session setup procedure and sends a refusal message to the terminal device.

Operation 310: The SMF sends a resource allocation response message to the terminal device.

The resource allocation response message includes indication information indicating whether a requested network resource is allocated to the terminal device.

In the third-party authorization method in FIG. 3, after receiving the authorization request message, the DN-AAA trusts the result of authentication performed by the SMF on the terminal device, and the SMF identifies the authenticated terminal device by using the SUPI*, so that a third party does not need to perform repeated authentication on the identity of the terminal device, thereby reducing authentication message overheads. In addition, the use of the encrypted SUPI* ensures that the SUPI of the terminal device is not leaked, thereby protecting user privacy. The third-party authorization request message includes the application identifier, so that an application-based fine-grained authorization function is implemented.

Embodiment 2

Figure 4:
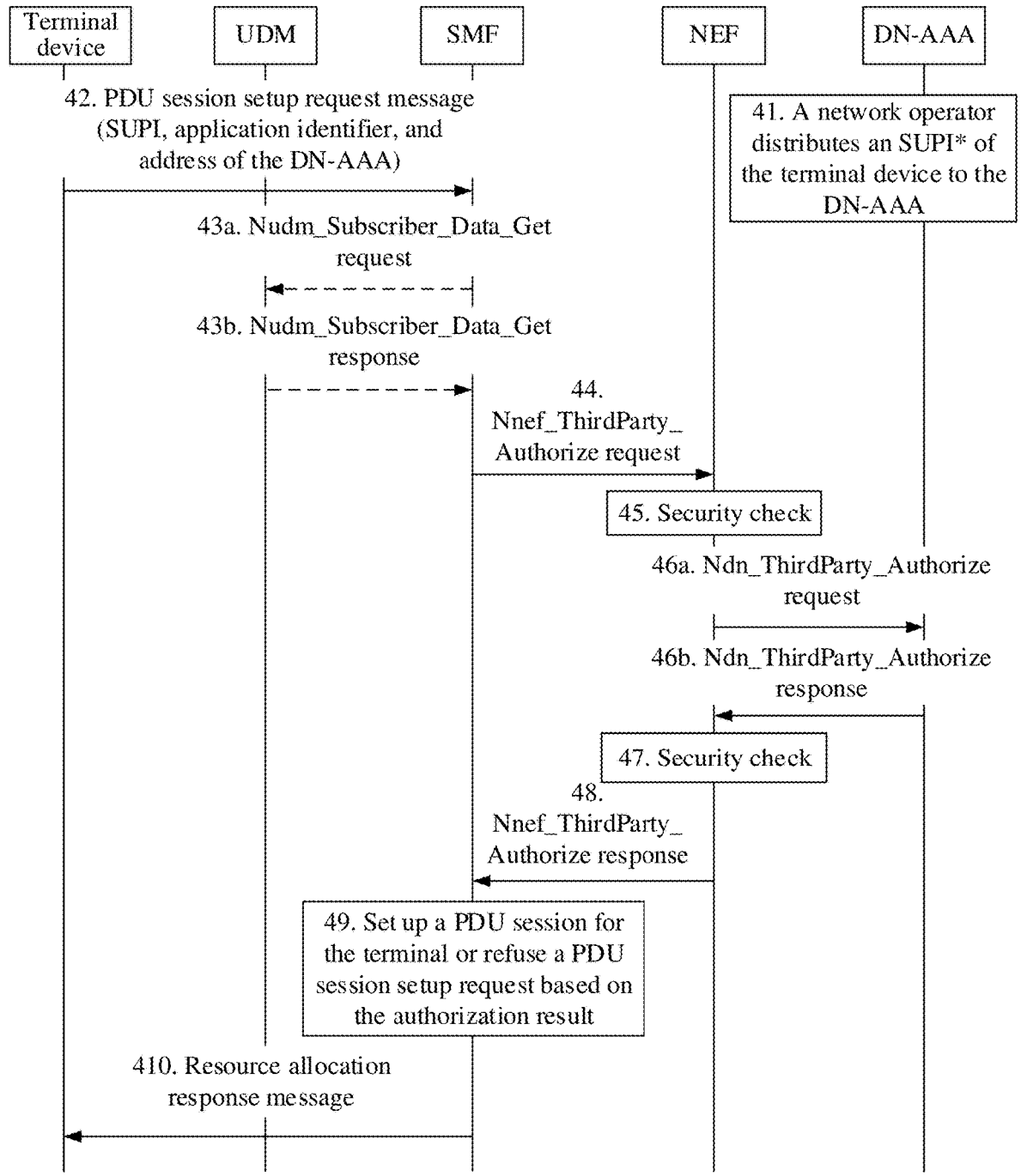

This embodiment is based on Embodiment 1, a signaling procedure is similar to that in Embodiment 1, and a difference lies in that a service request and a response message in this embodiment are implemented based on a service-based design. Specific signaling exchange is shown in FIG. 4, and operations are as follows:

For operation 41 and operation 42, refer to operation 31 and operation 32 above, and details are not described herein again.

Operation 43a: If the SMF does not store subscription data of the terminal device that is related to third-party authorization, the SMF invokes an Nudm_Subscriber_Data_Get service of the UDM. The service is described as follows:

Service Name: Nudm_Subscriber_Data_Get

Description: An invoker obtains subscription data of the terminal device from the UDM.

Invoker: SMF

Input (mandatory): SUPI, identifier of the SMF, and a type of requested subscription data Input (optional): DNN Output (mandatory): The invoker obtains the subscription data 43b: In response to the service invoking, the UDM returns the subscription data of the terminal device by using a subscription data response message, where the subscription data includes the SUPI* of the terminal device and authorization indication information indicating whether the third-party authorization is required.

Operation 44: The SMF receives the subscription data response message, and if the authorization indication information indicates that the third-party authorization is required, or the SMF determines, according to a local policy, that the third-party authorization is required, the SMF requests to invoke an Nnef_ThirdParty_Authorize service of the NEF. Input parameters are the SUPI* and an application identifier. The service is described as follows:

Service Name: Nnef_ThirdParty_Authorize

Description: if a service invoker requires the third-party authorization before allocating a network resource to the terminal device, the service invoker invokes the service.

Invoker: SMF

Input (mandatory): At least one of the SUPI* or an SUPI

Input (optional): Third-party identifier of the terminal device, SUPI, address of the authorization server, application identifier, and cryptographic algorithm identifier Output (mandatory): Authorization result, and SUPI*

Output (optional): Application identifier

Operation 45: The NEF performs security check on a service invoking request, where check content includes but is not limited to: whether the SMF is allowed to invoke the Nnef_ThirdParty_Authorize service, and whether corresponding message content meets a preset security policy.

Operation 46a: The NEF invokes an Ndn_ThirdParty_Authorize service of the DN-AAA, where inputs are the SUPI* and the application identifier. The service is described as follows:

Service Name: Ndn_ThirdParty_Authorize

Description: The authorization server (DN-AAA) sends the authorization result to the terminal device, to indicate whether the terminal device is authorized to use a requested network resource.

Invoker: NEF

Input (mandatory): At least one of the SUPI* or a third-party identifier of the terminal device Input (optional): Application identifier, and cryptographic algorithm identifier Output (mandatory): Authorization result, and SUPI*

Output (optional): Application identifier

46b: The DN-AAA finds corresponding authorization information based on the SUPI* and the application identifier, and sends the authorization result to the NEF as an output of the service invoking, where the output parameters include the authorization result, the SUPI*, and the application identifier.

Operation 47: The NEF performs security check on a service response message, where check content includes but is not limited to: source and integrity authentication on the authorization response message, whether a destination address of the message is an address of the SMF that previously invokes the Nnef_ThirdParty_Authorize service, and whether message content meets the preset security policy.

Operation 48: If the security check on the service response message succeeds, the NEF sends an Nnef_Third-Party_Authorize response message to the SMF as a service invoking response to operation 44, where output parameters of the response include the authorization result, the SUPI*, and the application identifier.

Operation 49: The SMF allocates a network resource to the terminal device based on the authorization result.

Specifically, if the authorization result indicates that it is allowed to set up a PDU session for the terminal device, the PDU session setup procedure continues to be performed; or if the authorization result indicates that it is not allowed to set up a PDU session for the terminal device, the SMF terminates the PDU session setup procedure and sends a refusal message to the terminal device.

Operation 410: The SMF sends a resource allocation response message to the terminal device.

The resource allocation response message includes indication information indicating whether a requested network resource is allocated to the terminal device.

Embodiment 3

Figure 5:
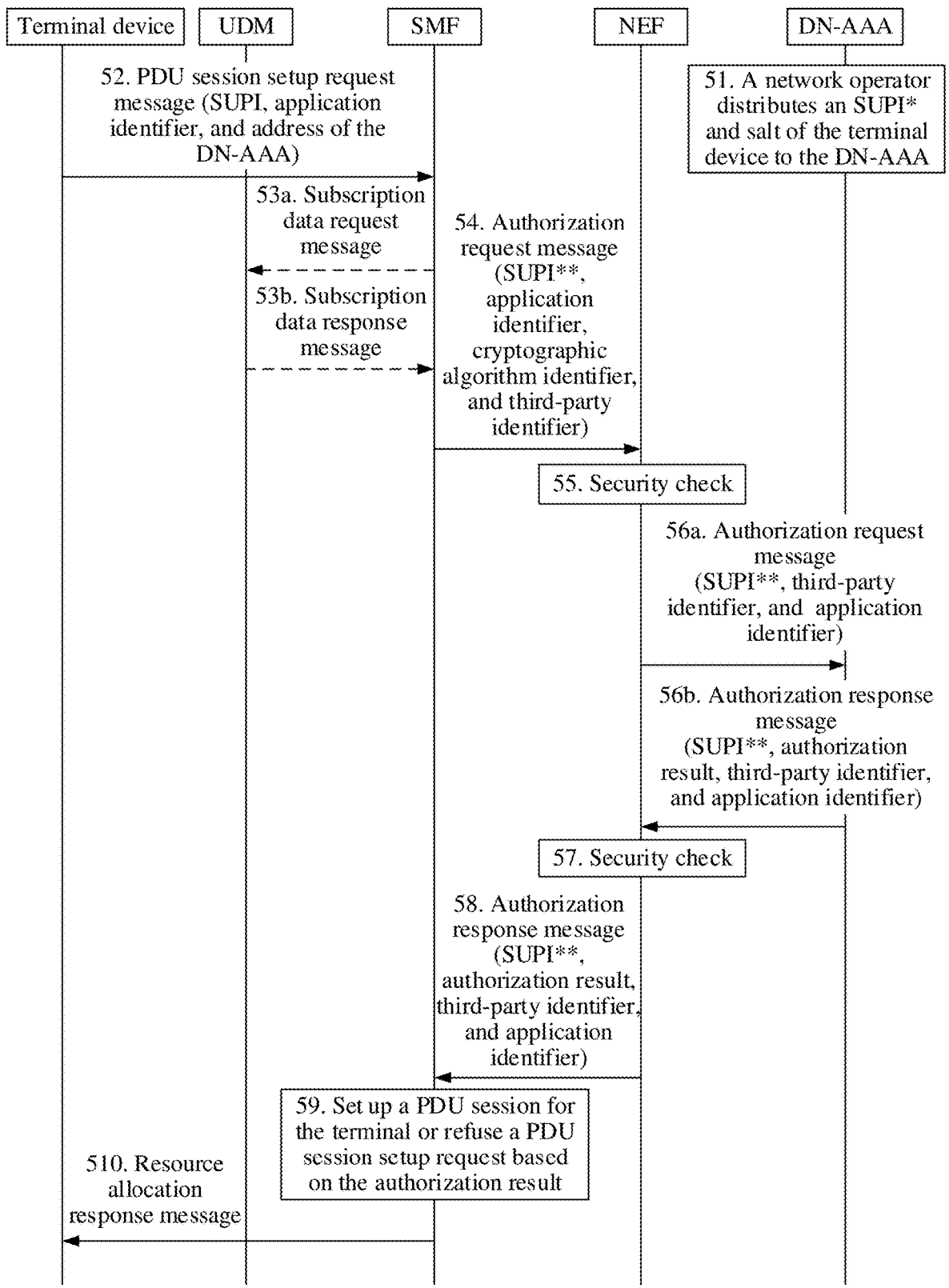

A difference between this embodiment and Embodiment 1 lies in that an encrypted user identifier uses an SUPI**. In this case, the UDM and the DN-AAA not only store an SUPI* of a terminal device, but also store a salt value used to calculate a variable SUPI**. Others are the same as those in Embodiment 1, and specific operations are shown in FIG. 5:

Operation 51: A network operator distributes an SUPI* and a salt value of the terminal device to the DN-AAA, in other words, notifies the DN-AAA of a corresponding SUPI* and salt of the terminal device, where the DN-AAA stores a correspondence between a third-party identifier of the terminal device and the SUPI* and the salt.

For operation 52, refer to operation 32. For operation 53a, refer to operation 33a.

Operation 53b: A subscription data response message returned by the UDM to the SMF includes the salt of the terminal device and authorization indication information indicating whether third-party authorization is required.

Table 2 shows a possible manner in which the UDM stores an SUPI, the SUPI*, and the salt of the terminal device.

TABLE 3

| SUPI | SUPI* | Salt |
| --- | --- | --- |
| 123456789012345 | 08227a870de5e2258c56b3ce0f629502e5d4fb71 | 08227a870de |

Operation 54: The SMF sends an authorization request message to an NEF, where the authorization request message includes an SUPI, an application identifier, a cryptographic algorithm identifier, and a third-party identifier of the terminal device, the SUPI=|ash(SUPI*|Salt), and the cryptographic algorithm identifier indicates a hash algorithm to be used, which includes but is not limited to MD5, SHA1, and SHA256.

For operation 55, refer to operation 35, and details are not described herein again.

Operation 56a: The NEF sends the authorization request message to the DN-AAA, where the authorization request message includes the SUPI**, the third-party identifier of the terminal device, and the application identifier.

Operation 56b. The DN-AAA returns an authorization response message to the NEF, where the authorization response message includes an authorization result, the SUPI**, the third-party identifier of the terminal device, and the application identifier.

Specifically, the DN-AAA finds a corresponding authorization record based on the third-party identifier of the terminal device, and calculates an SUPI 1**'=Hash(SUPI*, Salt) by using the SUPI*, the salt, and a hash algorithm specified by the cryptographic algorithm identifier in the authorization record. If the SUPI 1' is the same as the SUPI, it indicates that the SMF has authenticated the identity of the terminal device.

For example, an example in which the DN-AAA stores the authorization record of the terminal device is shown in Table 4.

TABLE 3

| Third-party identifier | SUPI* | salt | [Application identifier] | Permission | Extension data |
|---|---|---|---|---|---|
| watermeter32234237@smart.com | 08227a870de5e2258c56b3ce0f629502e5d4fb71 | 08227a870de | 8021 8022 8023 | Allowed Not allowed Allowed | |
| watermeter32234790@smart.com | 429f75a98a2f48bd7f0c71606b4795f67843df13 | 429f75a98a2 | 8021 | Allowed | |

For operation 57, refer to operation 37.

Operation 58: The authorization response message forwarded by the NEF to the SMF includes the authorization result, the SUPI**, the third-party identifier of the terminal device, and the application identifier.

For operation 59 and operation 510, refer to operation 39 and operation 310.

In this embodiment, the SMF may enable the SUPI** to be variable by using the hash algorithm, so that user privacy leakage caused due to frequent use of the SUPI* is avoided. The DN-AAA may update the third-party identifier of the terminal device, so that the terminal device cannot be tracked, thereby ensuring user data security of the terminal device.

Embodiment 4

Figure 6:
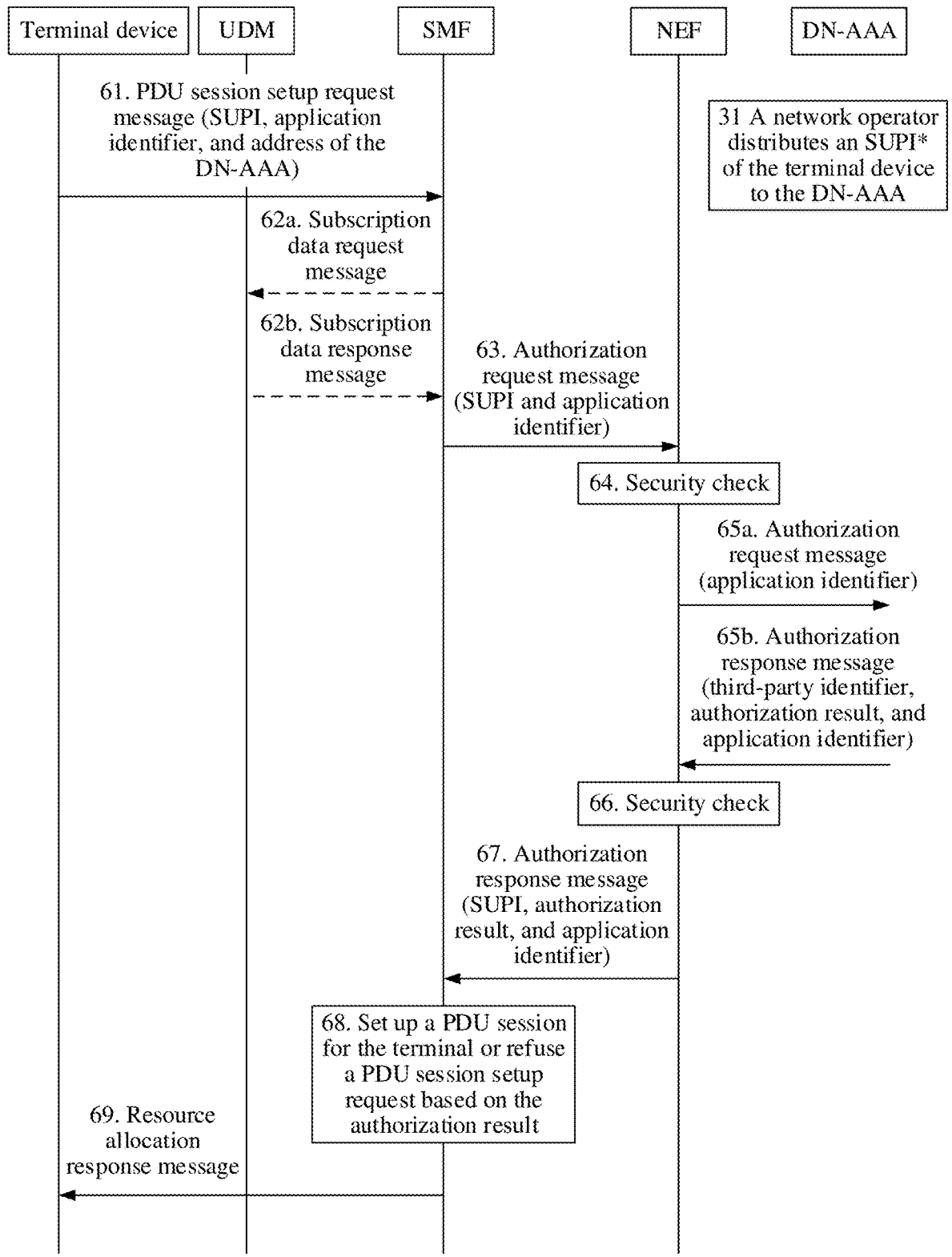

A procedure in this embodiment is similar to that in Embodiment 1. A difference from Embodiment 1 lies in that a subscriber permanent identifier uses an SUPI, a UDM stores a correspondence between the SUPI and a third-party identifier of a terminal device, and an NEF is responsible for conversion of identifiers of the terminal device in internal and external networks. Specific operations are shown in FIG. 6.

Operation 61: The terminal device sends a PDU session setup request message to an SMF, where the PDU session setup request message needs to be forwarded by an AMF (not shown), the PDU session setup request message is included in N1 SM information of an NAS message sent from UE to the AMF, and then the AMF sends the NAS message to the SMF. The PDU session request setup message includes the third-party identifier of the terminal device, that is, an SUPI, an application identifier, and an address of a DN-AAA.

In one embodiment, if the SMF has no subscription data of the UE that is related to third-party authorization, the SMF further needs to perform the following operations:

Operation 62a: The SMF sends a subscription data request message to the UDM.

Operation 62b: The UDM returns a subscription data response message to the SMF, where the subscription data response message includes authorization indication information indicating whether the third-party authorization is required.

In one embodiment, the SMF receives the subscription data response message, and if the authorization indication information in the subscription data response message indicates that PDU session setup requires the third-party authorization, the SMF performs operation 63.

In one embodiment, the SMF determines, based on a local configuration policy, that the PDU session setup requires the third-party authorization, and the SMF performs operation 63.

Operation 63: The SMF sends an authorization request message to the NEF, where the authorization request message includes the third-party identifier of the terminal device, the application identifier, and the SUPI.

Operation 64: The NEF performs security check on the authorization request message, and determines that the authorization request message meets a preset security requirement.

In addition to the security check, the NEF deletes the SUPI from the authorization request message, and records the correspondence between the third-party identifier and the SUPI of the terminal device.

Operation 65a: The NEF forwards the authorization request message not including the SUPI to the DN-AAA. In one embodiment, the authorization request message includes the application identifier.

Operation 65b: The DN-AAA queries, by using the third-party identifier of the terminal device as an index, authorization information corresponding to the third-party authorization request, uses the authorization information as an authorization result, and returns an authorization response message to the NEF, where the authorization response message includes the third-party identifier of the terminal device, the authorization result, and the application identifier.

Operation 66: The NEF performs security check on the authorization response message in operation 65b, where check content includes but is not limited to: source and integrity authentication on the authorization response message, whether a destination address of the message is an address of the SMF that previously sends the authorization request message, and whether message content meets the preset security policy.

In addition to the security check, the NEF obtains through query, the SUPI of the terminal device based on the third-party identifier of the terminal device in the authorization response message, and replaces the third-party identifier of the terminal device in the authorization response message with the SUPI.

Operation 67: The NEF forwards the authorization response message to the SMF, where the authorization response message includes the authorization result, the SUPI, and the application identifier.

Operation 68: The SMF allocates a network resource to the terminal device based on the authorization result.

Specifically, if the authorization result indicates that it is allowed to set up a PDU session for the terminal device, the PDU session setup procedure continues to be performed; or if the authorization result indicates that it is not allowed to set up a PDU session for the terminal device, the SMF terminates the PDU session setup procedure and sends a refusal message to the terminal device.

Operation 69: The SMF sends a resource allocation response message to the terminal device.

The resource allocation response message includes indication information indicating whether a requested network resource is allocated to the terminal device.

Embodiment 5

Figure 7:
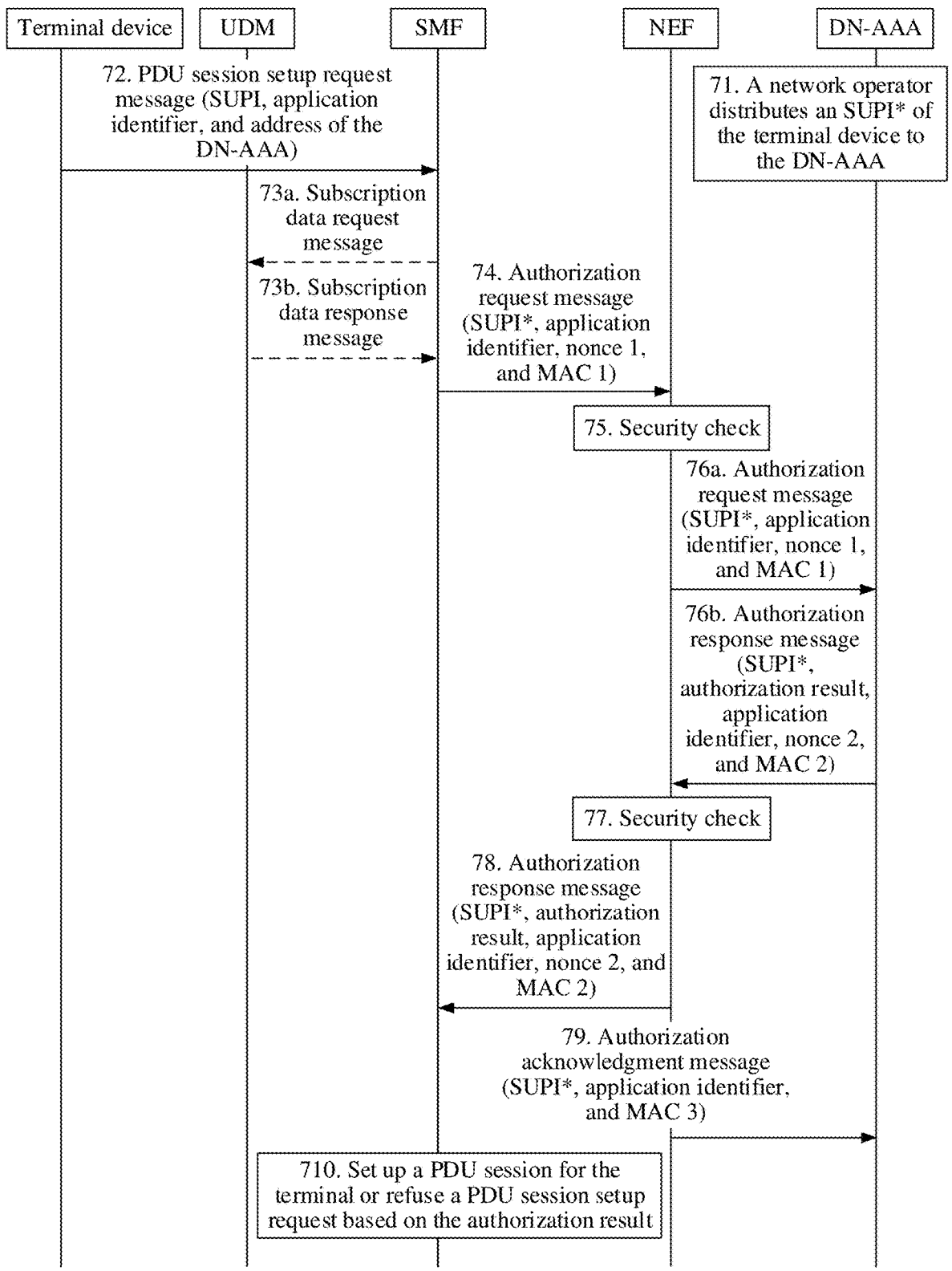

A procedure of this embodiment is similar to that of Embodiment 1, and a difference from Embodiment 1 lies in that an anti-replay capability is added for a service request and a response message. The anti-replay capability is implemented based on a symmetrically encrypted message authentication code. Specific operations are shown in FIG. 7.

It should be noted that, in this embodiment, an SMF and a DN-AAA negotiate, in advance, a symmetric key K used for encryption.

For operation 71 to operation 73*b*, refer to operation 31 to operation 33*b*.

Operation 74: The SMF sends an authorization request message to the NEF, where the authorization request message includes the SUPI*, an application identifier, a nonce 1, and a message authentication code MAC 1, the nonce 1 is a nonce generated by the SMF. MAC1=MAC(K, Nonce1), and the MAC is a message authentication code algorithm.

For operation 75, refer to operation 35.

Operation 76*a*: The NEF sends an authorization request message to the DN-AAA, where the authorization request message includes the SUPI*, the third-party identifier of the terminal device, the application identifier, the nonce 1, and the message authentication code MAC 1.

Operation 76*b*: The DN-AAA obtains through query, authorization information corresponding to the third-party authorization request, uses the authorization information as an authorization result, and returns an authorization response message to the NEF, where the authorization response message includes the SUPI*, the authorization result, the application identifier, a nonce 2, and a MAC 2. MAC2=MAC(K, Nonce1|Nonce2), the nonce 2 is a nonce generated by the DN-AAA, and Nonce1|Nonce2 instructs to connect the nonce 1 and nonce 2.

For operation 77, refer to operation 37.

Operation 78: The NEF determines that the security check on the authorization response message succeeds, and forwards the authorization response message to the SMF, where the authorization response message includes the SUPI*, the authorization result, the application identifier, the nonce 2, and the MAC 2.

Operation 79: The SMF sends an authorization acknowledgment message to the DN-AAA by using the NEF, where the authorization acknowledgment message includes the SUPI*, the application identifier, and a MAC 3, and MAG3=MAC(K, Nonce2).

For operation 710, refer to operation 39.

Embodiment 6

Figure 8:
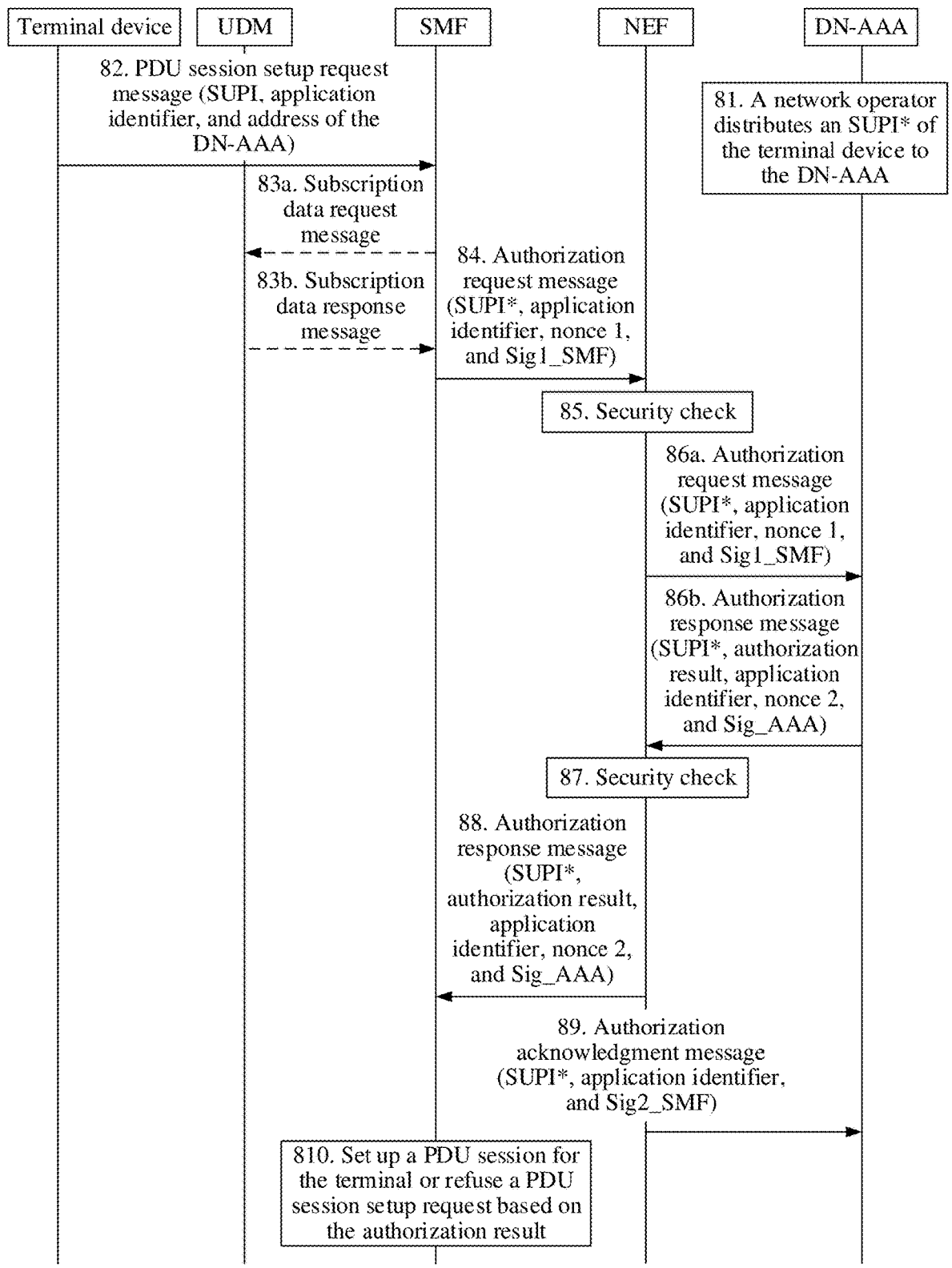

This embodiment is based on Embodiment 5, and a procedure in this embodiment is similar to that in Embodiment 5, but differs in that the anti-replay capability is implemented by using an asymmetrically encrypted digital signature. Specific operations are shown in FIG. 8.

For operation 81 to operation 83*b*, refer to operation 71 to operation 73*b*.

Operation 84: The SMF sends an authorization request message to the NEF, where the authorization request message includes the SUPI*, an application identifier, a nonce 1, and a digital signature Sig1_SMF, and in one embodiment, the authorization request message may further include a digital certificate of the SMF. Sig_SMF=E(PRSMF, Hash(Msg4)), the PRSMF is a private key of the SMF, E is an asymmetric encryption algorithm, and Msg4 is message content of the authorization request message.

For operation 85, refer to operation 75.

Operation 86*a*: The NEF sends an authorization request message to the DN-AAA, where the authorization request message includes the SUPI*, the third-party identifier of the terminal device, the application identifier, the nonce 1, and the digital signature Sig1_SM.

Operation 86*b*: The DN-AAA obtains through query, authorization information corresponding to the third-party authorization request, uses the authorization information as an authorization result, and returns an authorization response message to the NEF, where the authorization response message includes the SUPI*, the authorization result, the application identifier, a nonce 2, and a digital signature Sig_AAA, and in one embodiment, the authorization response message may further include a digital certificate of the DN-AAA. Sig_AAA=E(PRAAA, Hash(Msg6)), E is an asymmetric encryption algorithm, PRAAA is a private key of the DN-AAA, and Msg6 is message content of the authorization response message.

For operation 87, refer to operation 77.

Operation 88: The NEF determines that the security check on the authorization response message succeeds, and forwards the authorization response message to the SMF, where the authorization response message includes the SUPI*, the authorization result, the application identifier, the nonce 2, and Sig_AAA.

Operation 89: The SMF sends an authorization acknowledgment message to the DN-AAA by using the NEF, where the authorization acknowledgment message includes the SUPI*, the application identifier, and Sig2_SMF. Sig2_SMF=E(PRSMF, Hash(Msg9)), and Msg9 is message content of the authorization acknowledgment message.

Operation 810: The SMF allocates a network resource to the terminal device based on the authorization result. Specifically, if the authorization result indicates that it is allowed to set up a PDU session for the terminal device, the PDU session setup procedure continues to be performed. If the authorization result indicates that it is not allowed to set up a PDU session for the terminal device, the SMF terminates the PDU session setup procedure and sends a refusal message to the terminal device.

Embodiment 7

Figure 9:
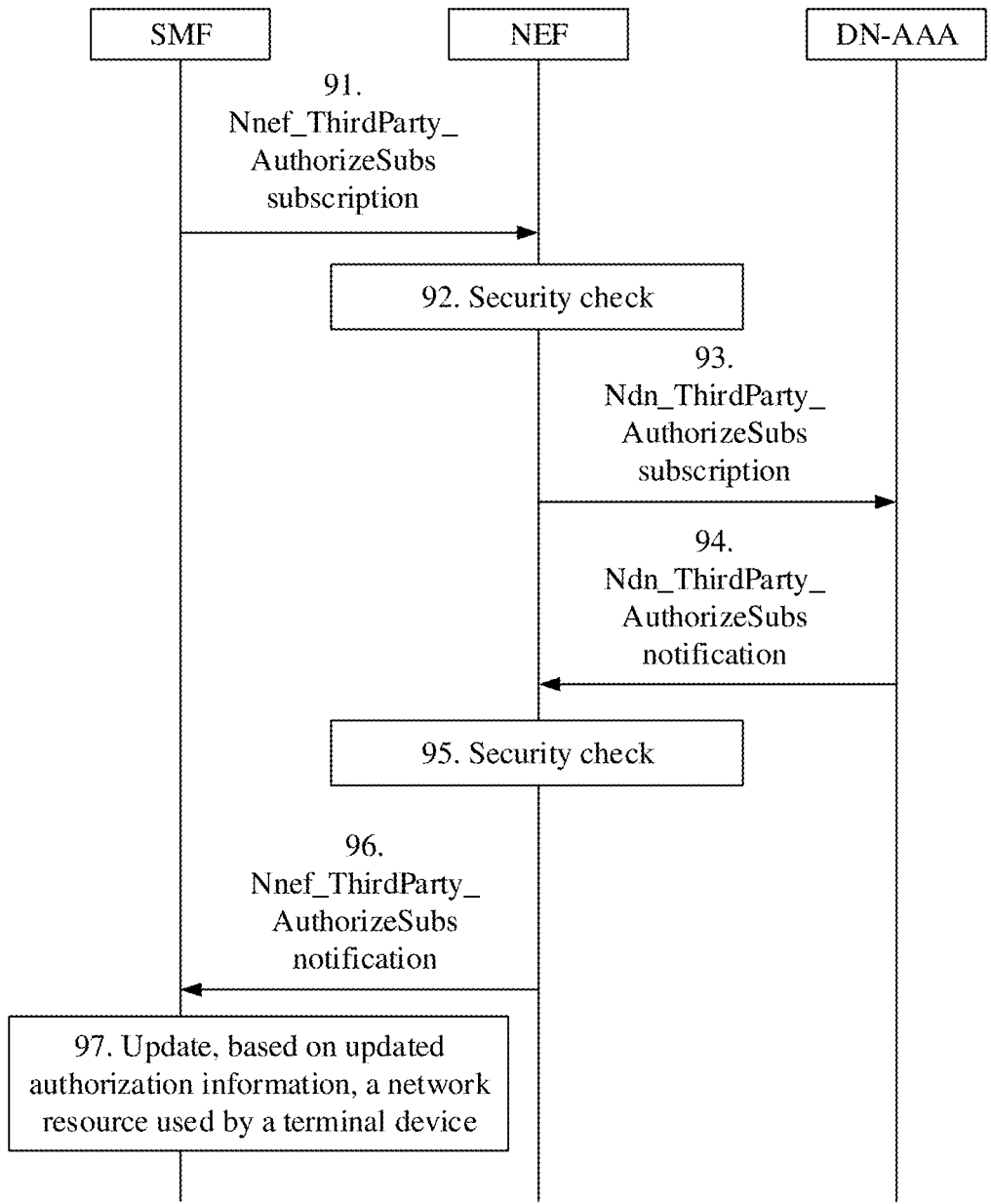

In this embodiment, a network side subscribes to authorization update information from a third party, so that the third party updates authorization information of a terminal device and actively sends the updated information to the network side, and the network side updates a network resource of the terminal device based on the updated authorization information. Specific operations are shown in FIG. 9.

Operation 91: An SMF invokes an Nnef_ThirdParty_AuthorizeSubs service of an NEF, where input parameters are an SUPI* and an application identifier, and definitions of the invoked service are as follows:

Service Name: Nnef_ThirdParty_AuthorizeSubs
Description: A service invoker subscribes to update of third-party authorization information of the terminal device
Invoker: SMF
Input (mandatory): At least one of the SUPI* or an SUPI
Input (optional): Third-party identifier of the terminal device, SUPI, address of an authorization server, and application identifier
Output (necessary): Updated authorization information, and SUPI*
Output (optional): Application identifier Operation 92: The NEF performs security check on a service invoking request, where check content includes but is not limited to: whether the SMF is allowed to invoke the Nnef_ThirdParty_AuthorizeSubs service, and whether message content meets a preset security policy.

Operation 93: If the security check on the service invoking request in operation 92 succeeds, the NEF invokes an Ndn_ThirdParty_AuthorizeSubs service of a DN-AAA, where input parameters are the SUPI* and the application identifier, and definitions of the service are as follows:

Service Name: Ndn_ThirdParty_AuthorizeSubs
Description: A service invoker subscribes to update of third-party authorization information of the terminal device.
Invoker: NEF
Input (mandatory): At least one of the SUPI* or an SUPI
Input (optional): Third-party identifier of the terminal device, SUPI, address of an authorization server, and application identifier
Output (necessary): Updated authorization information, and SUPI*
Output (optional): Application identifier Operation 94: If the DN-AAA updates the authorization information of the terminal device, and the service invoking in operation 93 indicates that update of the authorization information is subscribed to, the updated authorization information is sent to the NEF as an Ndn_ThirdParty_AuthorizeSubs service output parameter, that is, the updated authorization information is sent by using an Ndn_ThirdParty_AuthorizeSubs service notification message.

Operation 95: The NEF performs security check on the service notification message, where check content includes but is not limited to: source and integrity authentication on the service notification message, whether a destination address of the service notification message is correct, and whether message content meets the preset security policy.

Operation 96: If the security check on the service notification message in operation 95 succeeds, the NEF sends the updated authorization information to the SMF as an Nnef_ThirdParty_AuthorizeSubs service output parameter.

Operation 97: The SMF updates, based on the updated authorization information, a network resource used by the terminal device.

Embodiment 8

Figure 10:
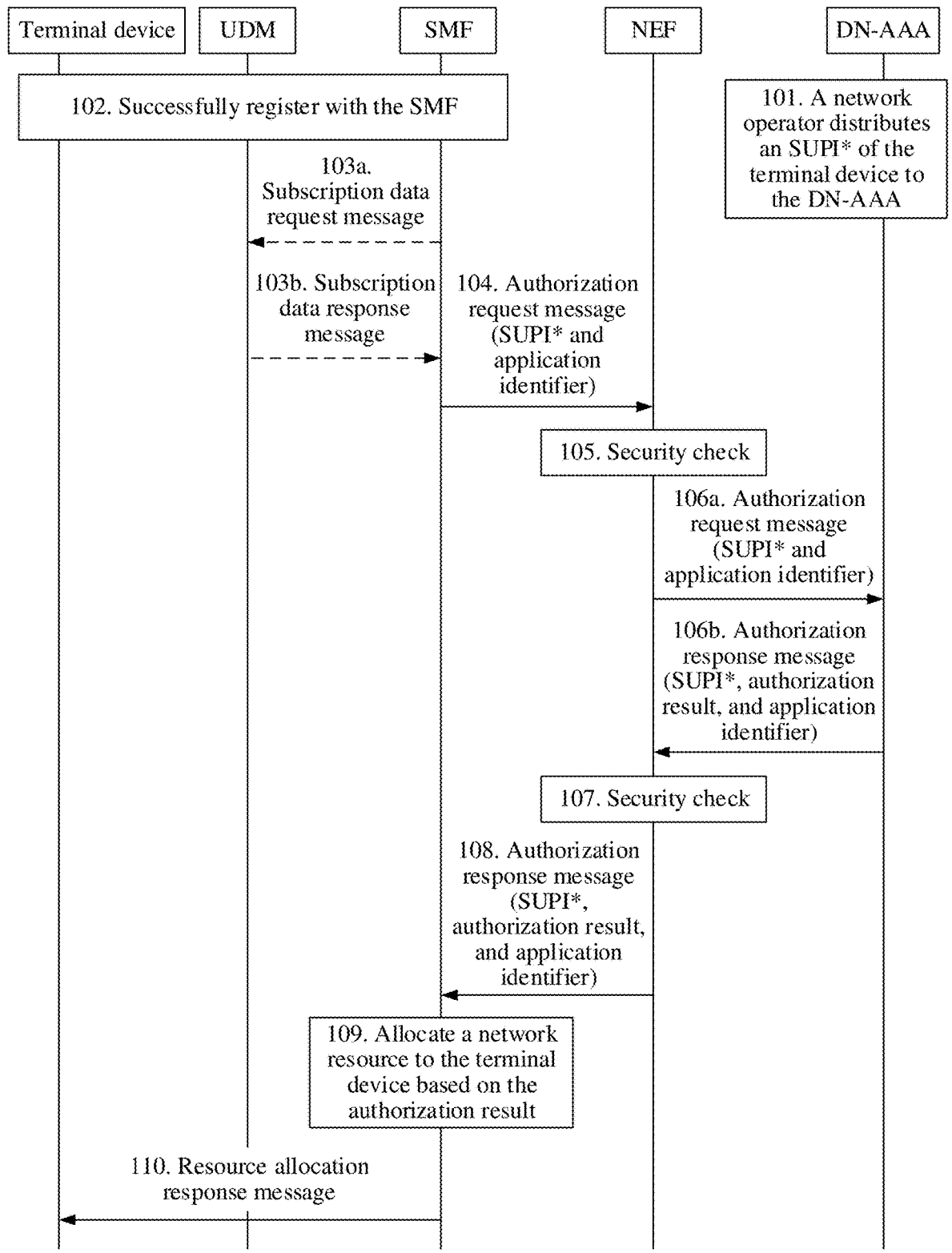

This embodiment differs from Embodiment 1 in that the resource usage request is a registration request. To be specific, after a terminal device successfully registers with a network, an AMF immediately applies for third-party authorization for the terminal device, and after the terminal device is authorized, the AMF can allocate a network resource to the terminal device at any time, instead of requesting a network resource when allocating the network resource to the terminal device. Message exchange is shown in FIG. 10, and specific operations are as follows:

A procedure in this embodiment is similar to that in Embodiment 1, and a difference lies in operation 102.

Operation 102: The terminal device successfully registers with an SMF.

For all other operations, refer to corresponding operations in Embodiment 1. For operation 101, refer to operation 31 in Embodiment 1. For operation 103a to operation 110, refer to operation 33a to operation 310 in Embodiment 1, and details are not described herein again.

Embodiment 9

Figure 11:
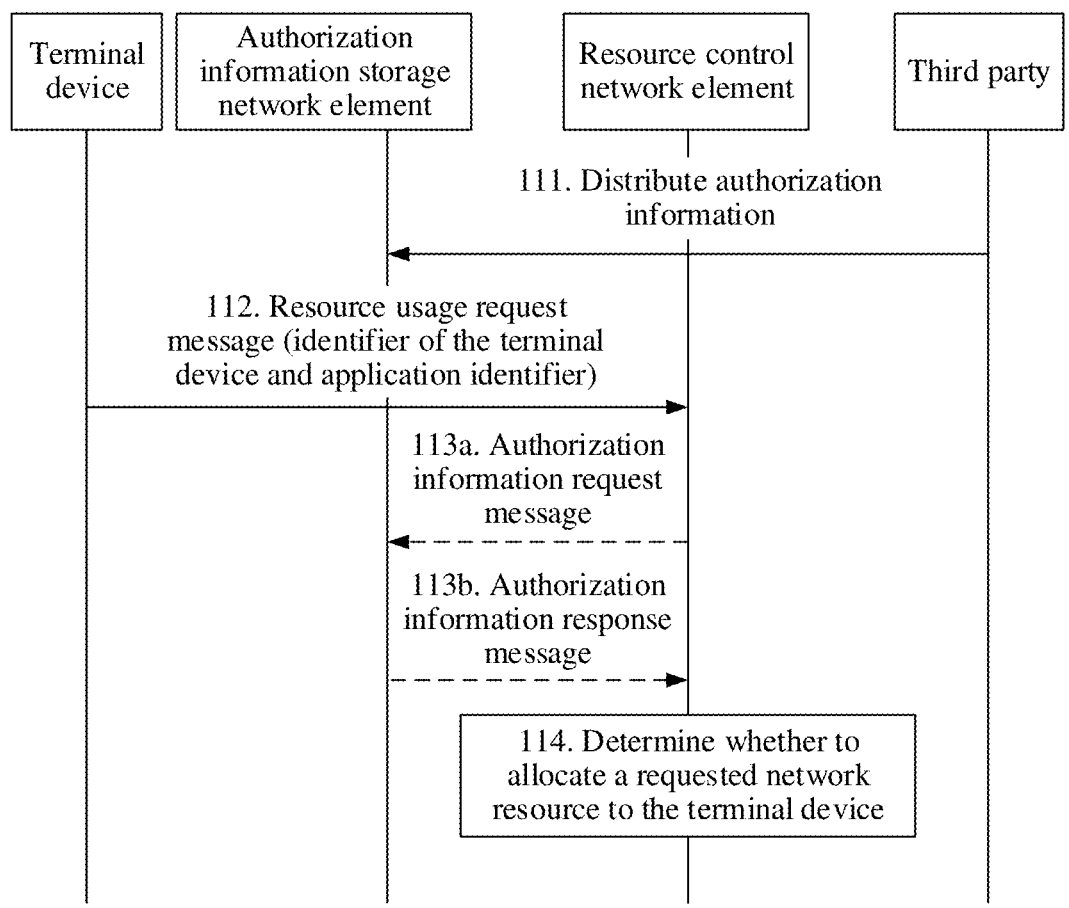

An application scenario of this embodiment is an application scenario in which a third party entrusts a network side to authorize a terminal device, that is, an authorization server sends authorization information to the network side. When the terminal device requests to use a network resource, the network side may directly query the authorization information without a need of requesting the authorization information from the third party online. Message exchange in this embodiment is shown in FIG. 11, and specific operations are as follows:

Operation 111: The third party distributes authorization information to an authorization information storage network element at the network side.

The third party includes but is not limited to an authorization server, a DN-AAA, and an administrator. The authorization information storage network element includes but is not limited to a UDM, a UDR, and an HSS. A distribution manner may be offline distribution, or may be online sending. For example, Table 5 shows one embodiment of the authorization information. The third party sends content shown in Table 4 to the authorization information storage network element, and the authorization information storage network element can establish a one-to-one correspondence between a third-party identifier of the terminal device and an SUPI.

TABLE 4

| Third-party identifier (NAI) of the terminal device | Permission | [Application identifier] | Extra data |
| --- | --- | --- | --- |
| watermeter32234237 @smart.com | Allowed Not allowed Allowed | 8021 8022 8023 | |
| watermeter32234790 @smart.com | Allowed Not allowed | 8021 8022 | |

Operation 112: The terminal device sends a resource usage request message to a resource control network element, where the resource usage request message includes at least one of an identifier of the terminal device or an application identifier, and the identifier of the terminal device includes but is not limited to a third-party identifier of the terminal device, such as an SUPI, a 5G-GUTI, a GUTI, or a TMSI.

Operation 113a: The resource control network element sends, to the authorization information storage network element, an authorization information request message used to request authorization information of the terminal device, where the authorization information request message includes but is not limited to the identifier of the terminal device and the application identifier.

Operation 113b: The authorization information storage network element sends an authorization information response message to the resource control network element, where the authorization information response message includes at least one of an authorization result or the authorization information, the authorization result is used to indicate whether the terminal device is allowed to use a network resource, and the authorization information is information that records permission of the terminal device.

Operation 114: The resource control network element determines, based on the received authorization result or authorization information, whether to allocate a requested network resource to the terminal device.

It should be noted that the service request and the response message in this embodiment may alternatively be implemented by using the service-based design in Embodiment 2.

Embodiment 10

Figure 12:
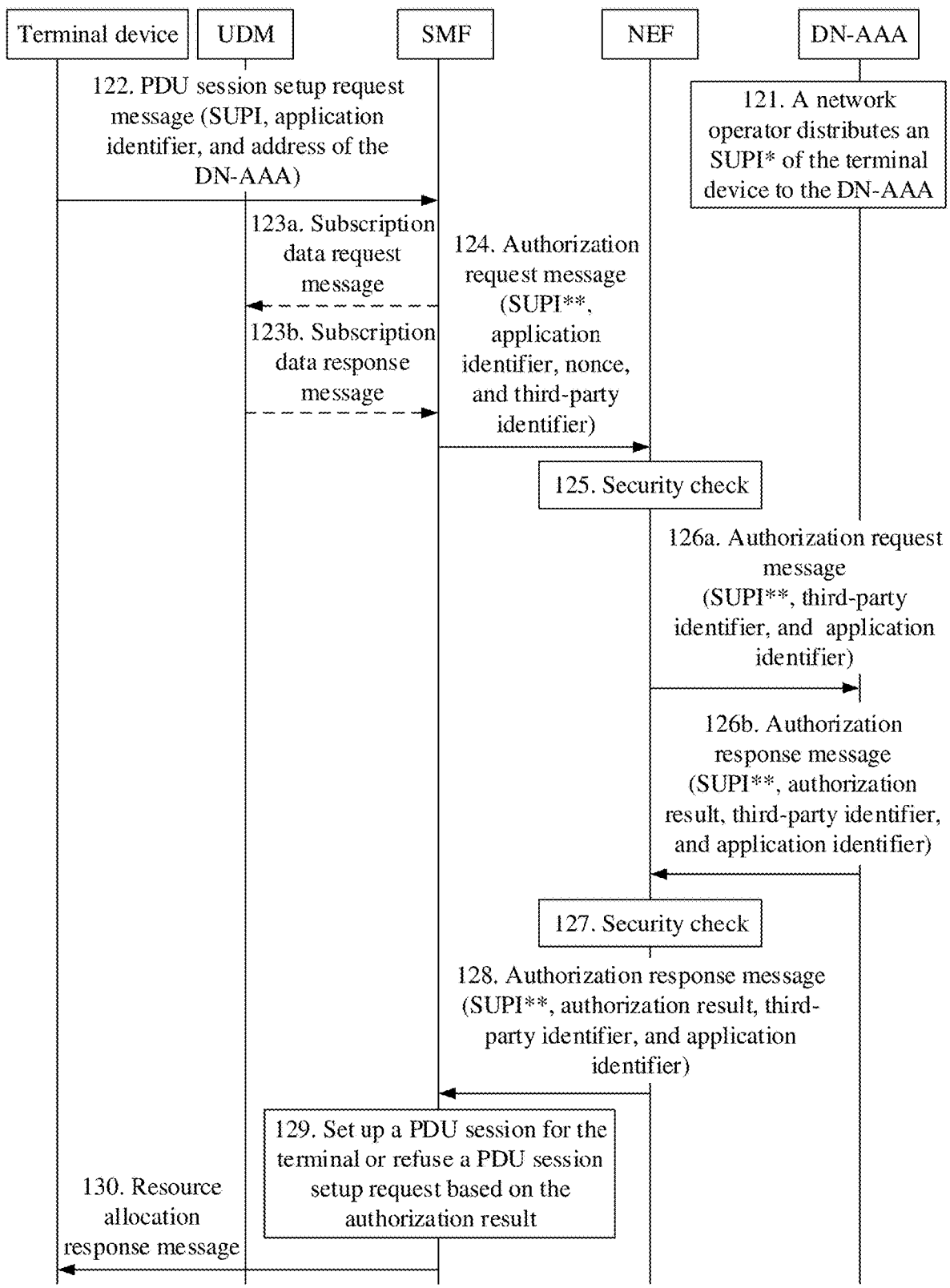

A procedure of this embodiment is similar to that in Embodiment 1, and a difference lies in that a subscriber permanent identifier uses an SUPI, an SMF calculates the SUPI based on an SUPI* and a nonce, and the nonce may be a nonce or a random character string generated by the SMF. In addition, an authorization request message and an authorization response message include the SUPI** rather than the SUPI*. Specific operations are shown in FIG. 12:

Operation 121: The SMF distributes an SUPI* of a terminal device to a DN-AAA, in other words, notifies a DN-AAA of an SUPI* corresponding to a terminal device, and the DN-AAA stores a correspondence between a third-party identifier of the terminal device and the SUPI*.

For operation 122, refer to operation 32. For operation 123a, refer to operation 33a. Details are not described herein again.

Operation 123b: A subscription data response message returned by a UDM to the SMF includes authorization indication information indicating whether third-party authorization is required.

Operation 124: The SMF sends an authorization request message to an NEF, where the authorization request message includes the third-party identifier of the terminal device, the SUPI, a nonce, and an application identifier, and in on embodiment, the authorization request message may further include a parameter Para. The SUPI=Hash(SUPI*, Nonce, [Para]), hash is a hash algorithm, and Para includes but is not limited to a nonce, a value on a counter, an SUPI, a 5G-GUTI, a TMSI, a GUTI, a character string, an operator identifier, a serving network identifier, and an application identifier.

Operation 126a: The NEF sends the authorization request message to the DN-AAA, where the authorization request message includes the SUPI**, the third-party identifier of the terminal device, and the application identifier.

Operation 126b: The DN-AAA finds a corresponding authorization record based on the third-party identifier of the terminal device, and calculates an SUPI 1**'=Hash(SUPI*, Nonce, [Para]) by using the SUPI* in the authorization record, and the nonce and Para in the authorization request message. If the SUPI 1' is the same as the SUPI, it indicates that the SMF has authenticated the identity of the terminal device. The DN-AAA returns an authorization response message to the NEF, where the authorization response message includes an authorization result, the SUPI**, the third-party identifier of the terminal device, and the application identifier.

For operation 127, refer to operation 37.

Operation 128: The authorization response message forwarded by the NEF to the SMF includes the authorization result, the SUPI**, the third-party identifier of the terminal device, and the application identifier.

For operation 129 and operation 130, refer to operation 39 and operation 310.

Figure 13:
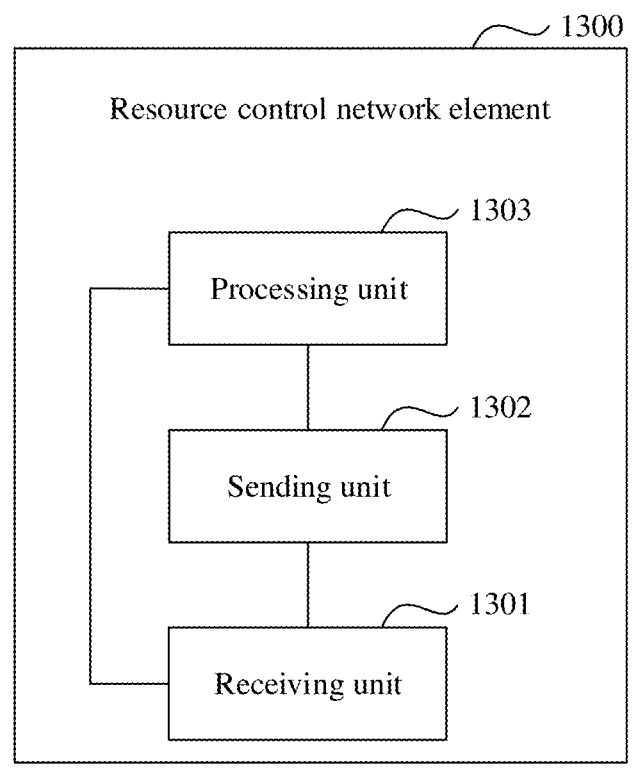
FIG. 13 is a schematic structural diagram of a resource control network element according to an embodiment of this application.

Based on the foregoing method embodiments, an embodiment of this application further provides a resource control network element. The resource control network element may perform the execution process of the resource control network element shown in FIG. 2, or may perform the execution process of the SMF shown in FIG. 3 to FIG. 12. Referring to FIG. 13, the resource control network element 1300 includes: a receiving unit 1301, a sending unit 1302, and a processing unit 1303.

The receiving unit 1301 is configured to receive a resource usage request message sent by a terminal device, where the resource usage request message includes a third-party user identifier of the terminal device.

The processing unit 1303 is configured to replace the first user identifier with a second user identifier.

The sending unit 1302 is configured to send an authorization request message to an authorization server by using a network exposure function NEF, where the authorization request message includes the second user identifier of the terminal device.

The receiving unit 1301 is further configured to receive, by using the NEF, an authorization response message sent by the authorization server, where the authorization response message includes an authorization result that is obtained by the authorization server by performing authorization based on the second user identifier and the resource usage request message.

The processing unit 1303 is further configured to allocate a network resource to the terminal device based on the authorization result.

The sending unit 1302 is further configured to send a resource allocation response message to the terminal device.

In one embodiment, when replacing the first user identifier with the second user identifier, the processing unit 1303 is specifically configured to:

perform identity verification on the first user identifier, and after determining that the identity verification on the first user identifier succeeds, replace the first user identifier with the second user identifier.

When performing the identity verification on the first user identifier, the processing unit is specifically configured to:

determine that the identity verification on the first user identifier succeeds, when determining that the first user identifier is a subscriber permanent identifier, a subscriber temporary identity, or a third-party user identifier.

In one embodiment, the second user identifier is an encrypted first user identifier.

In one embodiment, before replacing the first user identifier with the second user identifier, the processing unit 1303 is further configured to:

generate the second user identifier by encrypting a public key of the resource control network element, the first user identifier, and a preset parameter by using an asymmetric encryption algorithm;

generate the second user identifier by encrypting a public key of the resource control network element, the first user identifier, and a preset parameter by using a symmetric encryption algorithm;

generate the second user identifier by encrypting the first user identifier and a preset parameter by using a hash encryption algorithm; or generate the second user identifier by encrypting a nonce of the resource control network element, the first user identifier, and a preset parameter by using a hash encryption algorithm.

In one embodiment, before replacing the first user identifier with the second user identifier, the processing unit 1303 is further configured to:

calculate the second user identifier by using the encrypted first user identifier, a preset variable factor, and a preset encryption algorithm; and the encrypted first user identifier is generated by:

encrypting a public key of the resource control network element, the first user identifier, and a preset parameter by using an asymmetric encryption algorithm;

encrypting a public key of the resource control network element, the first user identifier, and a preset parameter by using a symmetric encryption algorithm;

encrypting the first user identifier and a preset parameter by using a hash encryption algorithm; or encrypting a nonce of the resource control network element, the first user identifier, and a preset parameter by using a hash encryption algorithm.

In one embodiment, the authorization request message further includes an application identifier, and the authorization response message includes the authorization result that is obtained by the authorization server by performing authorization based on the second user identifier, the application identifier, and the resource usage request message.

In one embodiment, the authorization response message further includes the second user identifier.

In one embodiment, the authorization request message further includes a first message authentication code, and the authorization server verifies security of the authorization request message by using the first message authentication code; and the authorization response message further includes a second message authentication code, and the processing unit 1303 verifies security of the authorization response message by using the second message authentication code.

In one embodiment, after the receiving unit 1301 receives, by using the NEF, the authorization response message sent by the authorization server, the sending unit 1302 is further configured to:

send a third-party authorization acknowledgment message to the authorization server by using the NEF, where the third-party authorization acknowledgment message includes a third message authentication code, and the third message authentication code is used by the authorization server to verify security of the third-party authorization acknowledgment message.

In one embodiment, before the sending unit 1302 sends the authorization request message to the authorization server, the receiving unit 1301 is further configured to receive a subscription data response message of the terminal device, where the subscription data response message includes third-party authorization indication information, and the third-party authorization indication information is used to indicate that third-party authorization needs to be performed on the terminal device; or the processing unit 1303 is further configured to determine, according to a local configuration policy, that third-party authorization needs to be performed on the terminal device.

In one embodiment, the resource usage request message is a session setup request message or a registration request message.

In one embodiment, when allocating a network resource to the terminal device based on the authorization result, the processing unit 1303 is specifically configured to:

if the authorization result is that the terminal device is allowed to use a network resource, allocate a requested network resource to the terminal device; or if the authorization result is that the terminal device is not allowed to use a network resource, refuse to allocate a requested network resource to the terminal device.

It should be noted that, for specific function descriptions of the foregoing units, refer to the third-party authorization method provided in the embodiments, and details are not described herein again. In this embodiment of this application, unit division is an example, and is merely logical function division. In one embodiment, another division manner may be used. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 14:
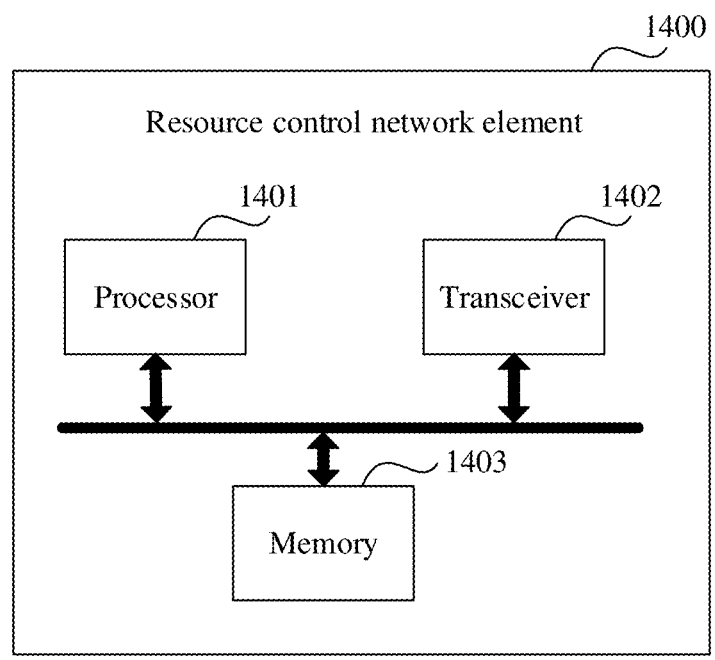
FIG. 14 is a schematic structural diagram of another resource control network element according to an embodiment of this application.

Based on a same inventive concept, an embodiment of this application further provides a resource control network element. The resource control network element may perform the method performed by the resource control network element side or the SMF side in the foregoing method embodiments. Referring to FIG. 14, the resource control network element 1400 includes: a processor 1401, a transceiver 1402, and a memory 1403.

The processor 1401 is configured to read a program in the memory 1403, to perform the following processes:

The processor 1401 is configured to: control the transceiver 1402 to receive a resource usage request message sent by a terminal device, where the resource usage request message includes a third-party user identifier of the terminal device; receive a resource usage request message sent by the terminal device, where the resource usage request message includes a first user identifier of the terminal device; replace the first user identifier with a second user identifier, and control the transceiver 1402 to send an authorization request message to an authorization server by using a network exposure function NEF, where the authorization request message includes the second user identifier of the terminal device; control the transceiver 1402 to receive, by using the NEF, an authorization response message sent by the authorization server, where the authorization response message includes an authorization result that is obtained by the authorization server by performing authorization based on the second user identifier and the resource usage request message; allocate a network resource to the terminal device based on the authorization result, and send a resource allocation response message to the terminal device; and allocate a network resource to the terminal device based on the authorization result, and control the transceiver 1402 to send a resource allocation response message to the terminal device.

The memory 1403 may store data used by the processor 1401 when the processor 1401 performs an operation. The memory 1403 may be a disk memory, a CD-ROM, or an optical memory, or may be a memory of a physical host that carries a resource control network element, for example, a hard disk, a USB flash drive, or a secure digital (SD) card.

It should be noted that in some embodiments, functions of the receiving unit 1301 and the sending unit 1302 in FIG. 13 may be implemented by the transceiver 1402 in FIG. 14, and a function of the processing unit 1303 in FIG. 13 may be implemented by the processor 1401 in FIG. 14.

An embodiment further provides a computer storage medium, configured to store a computer software instruction used by the resource control network element in the foregoing embodiments. The computer software instruction includes a program designed for performing the foregoing embodiments.

Figure 15:
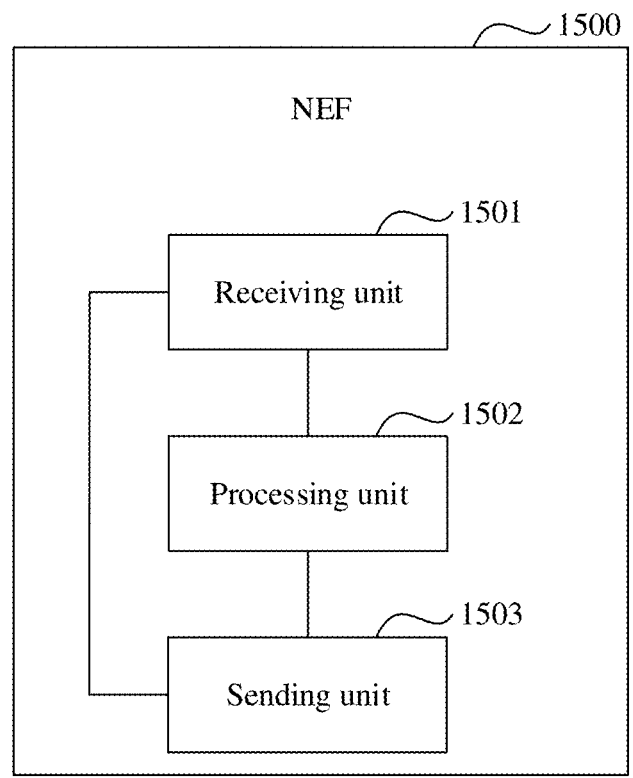
FIG. 15 is a schematic structural diagram of an NEF according to an embodiment of this application.

Based on the foregoing method embodiments, an embodiment of this application further provides a network exposure function NEF. The NEF may perform the execution processes of the NEF shown in FIG. 2 to FIG. 13. Referring to FIG. 15, the NEF 1500 includes: a receiving unit 1501, a processing unit 1502, and a sending unit 1503.

The receiving unit 1501 is configured to receive an authorization request message sent by a resource control network element, where the authorization request message includes an encrypted user identifier of the terminal device.

The processing unit 1502 is configured to determine that the authorization request message meets a preset security requirement.

The sending unit 1503 is configured to send the authorization request message to an authorization server.

The receiving unit 1501 is further configured to receive an authorization response message that is fed back by the authorization server based on the authorization request message.

The processing unit 1502 is further configured to determine that the authorization response message meets the preset security requirement.

The sending unit 1503 is further configured to send the authorization response message to the resource control network element.

In one embodiment, when determining that the authorization request message meets the preset security requirement, the processing unit 1502 is specifically configured to:

determine that the resource control network element is allowed to send the authorization request message; and/or determine that message content of the authorization request message meets a preset security policy.

In one embodiment, when determining that the authorization response message meets the preset security requirement, the processing unit 1502 is specifically configured to:

determine that the authorization server is allowed to send the authorization response message;

determine that message content of the authorization response message meets a preset security policy; and/or determine that a destination address of the authorization response message is consistent with a source address of the authorization request message.

It should be noted that, for specific function descriptions of the foregoing units, refer to the third-party authorization method provided in the embodiments, and details are not described herein again. In this embodiment of this application, unit division is an example, and is merely logical function division. In some embodiments, another division manner may be used. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 16:
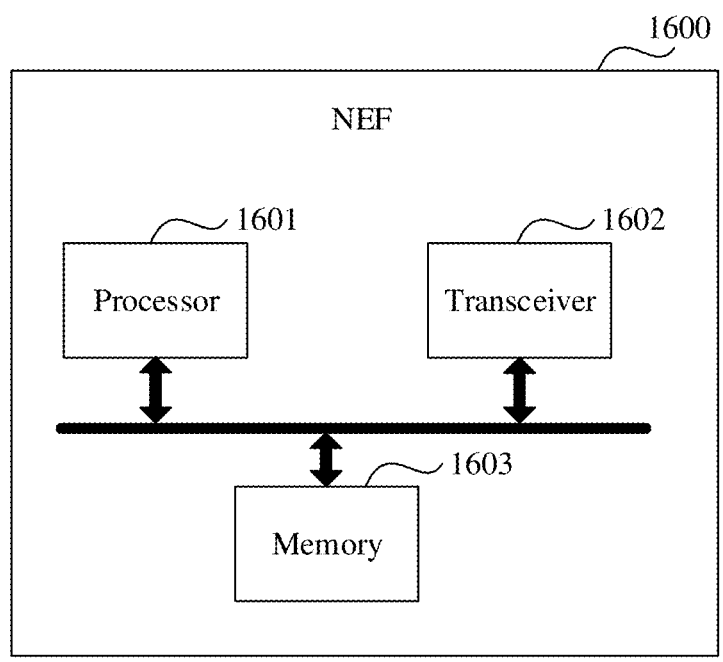
FIG. 16 is a schematic structural diagram of another NEF according to an embodiment of this application.

Based on a same inventive concept, an embodiment of this application further provides a network open network element NEF. The NEF may perform the method performed by the NEF side in the foregoing method embodiments. Referring to FIG. 16, the NEF 1600 includes: a processor 1601, a transceiver 1602, and a memory 1603.

The processor 1601 is configured to read a program in the memory 1603, to perform the following processes:

The processor 1601 is configured to: control the transceiver 1602 to receive an authorization request message sent by a resource control network element, where the authorization request message includes an encrypted user identifier of the terminal device; determine that the authorization request message meets a preset security requirement; control the transceiver 1602 to send the authorization request message to an authorization server; control the transceiver 1602 to receive an authorization response message that is fed back by the authorization server based on the authorization request message; determine that the authorization response message meets the preset security requirement; and control the transceiver 1602 to send the authorization response message to the resource control network element.

The memory 1603 may store data used by the processor 1601 when the processor 1601 performs an operation. The memory 1603 may be a disk memory, a CD-ROM, or an optical memory, or may be a memory of a physical host of the NEF, for example, a hard disk, a USB flash drive, or a secure digital (SD) card.

It should be noted that in some embodiments, functions of the receiving unit 1501 and the sending unit 1503 in FIG. 15 may be implemented by the transceiver 1602 in FIG. 16, and a function of the processing unit 1502 in FIG. 15 may be implemented by the processor 1601 in FIG. 16.

An embodiment further provides a computer storage medium, configured to store a computer software instruction used by the NEF in the foregoing embodiments. The computer software instruction includes a program designed for performing the foregoing embodiments.

Figure 17:
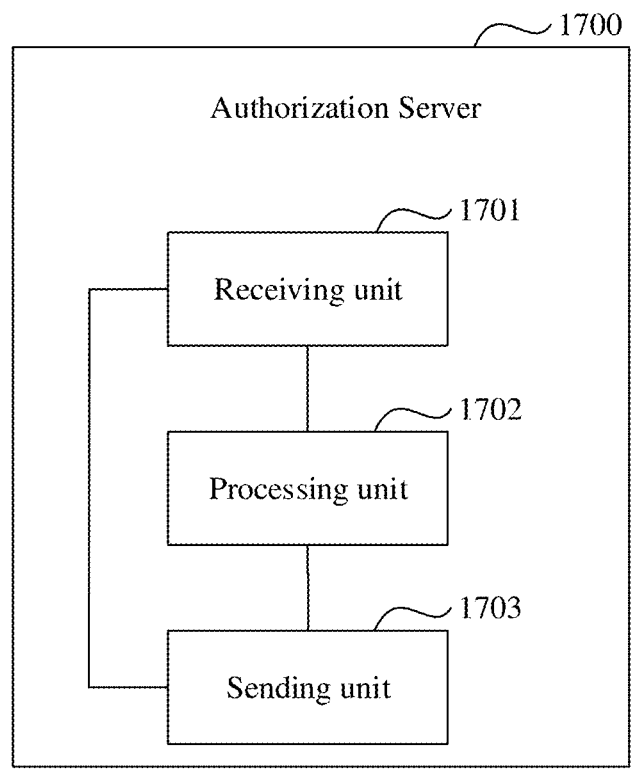
FIG. 17 is a schematic structural diagram of an authorization server according to an embodiment of this application.

Based on the foregoing method embodiments, an embodiment of this application further provides an authorization server. The authorization server may perform the execution processes of the authorization server or the DN-AAA shown in FIG. 2 to FIG. 13. Referring to FIG. 17, the authorization server 1700 includes: a receiving unit 1701, a processing unit 1702, and a sending unit 1703.

The receiving unit 1701 is configured to receive an authorization request message sent by a network exposure function NEF, where the authorization request message includes an encrypted user identifier of a terminal device.

The processing unit 1702 is configured to query, based on locally stored authorization information of the terminal device, an authorization result corresponding to the encrypted user identifier.

The sending unit 1703 is configured to send an authorization response message to the resource control network element by using the NEF, where the authorization response message includes the authorization result.

In one embodiment, the authorization request message further includes an application identifier, and the authorization response message further includes the application identifier; and when querying, based on the locally stored authorization information of the terminal device, the authorization result corresponding to the subscriber permanent identifier, the processing unit 1702 is specifically configured to:

query, based on the locally stored authorization information of the terminal device, the authorization result corresponding to the subscriber permanent identifier and the application identifier.

It should be noted that, for specific function descriptions of the foregoing units, refer to the third-party authorization method provided in the embodiments, and details are not described herein again. In this embodiment of this application, unit division is an example, and is merely logical function division. In some embodiments, another division manner may be used. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 18:
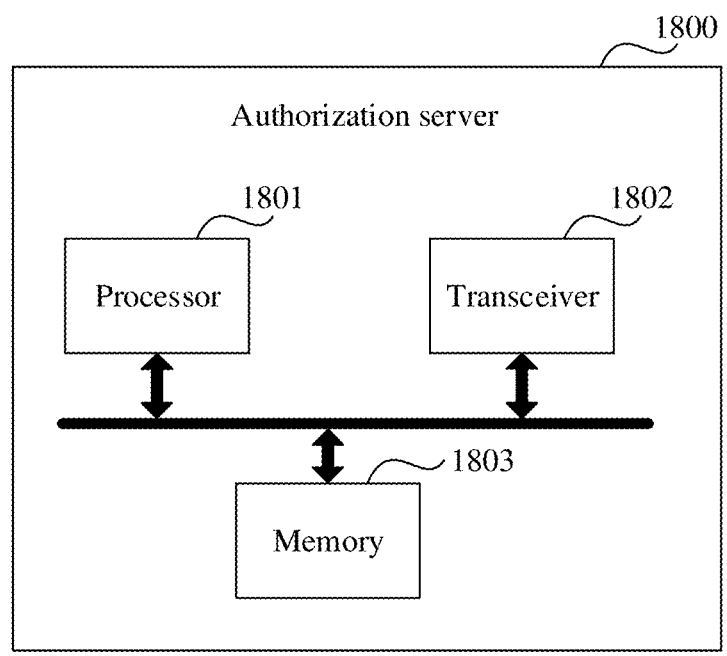
FIG. 18 is a schematic structural diagram of another authorization server according to an embodiment of this application.

Based on a same inventive concept, an embodiment of this application further provides an authorization server. The authorization server may perform the method performed by the authorization server side or the DN-AAA side in the foregoing method embodiments. Referring to FIG. 18, the authorization server 1800 includes: a processor 1801, a transceiver 1802, and a memory 1803.

The processor 1801 is configured to read a program in the memory 1803, to perform the following processes:

The processor 1801 is configured to: control the transceiver 1802 to receive an authorization request message sent by a network exposure function NEF, where the authorization request message includes an encrypted user identifier of a terminal device; query, based on locally stored authorization information of the terminal device, an authorization result corresponding to the encrypted user identifier; and control the transceiver 1802 to send an authorization response message to the resource control network element by using the NEF, where the authorization response message includes the authorization result. The memory 1803 may store data used by the processor 1801 when the processor 1801 performs an operation. The memory 1803 may be a disk memory, a CD-ROM, or an optical memory, or may be a memory of a physical host of the authorization server, for example, a hard disk, a USB flash drive, or a secure digital (SD) card.

It should be noted that in some embodiments, functions of the receiving unit 1701 and the sending unit 1703 in FIG. 17 may be implemented by the transceiver 1802 in FIG. 18, and a function of the processing unit 1702 in FIG. 17 may be implemented by the processor 1801 in FIG. 18.

An embodiment further provides a computer storage medium, configured to store a computer software instruction used by the authorization server in the foregoing embodiments. The computer software instruction includes a program designed for performing the foregoing embodiments.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by the computer or the processor of the any other programmable data processing device generate an apparatus for implementing a specific function in one or more processes in the flowcharts and/or in one or more blocks in the block diagrams.

These computer program instructions may be stored in a computer-readable memory that can instruct the computer or the any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto the computer or the any other programmable data processing device, so that a series of operations and operations are performed on the computer or the any other programmable device, thereby generating computer-implemented processing. Therefore, the instructions executed on the computer or the any other programmable device provide operations for implementing a specific function in one or more processes in the flowcharts and/or in one or more blocks in the block diagrams.

Definitely, a person skilled in the art can make various modifications and variations to the embodiments of this application without departing from the spirit and scope of this application. This application is also intended to cover these modifications and variations to embodiments of this application provided that the modifications and variations fall within the scope of protection defined by the following claims and their equivalent technologies.

What is claimed is:

1. An authorization method, comprising:
   receiving, by a resource control network element, a resource usage request message sent by a terminal device, wherein the resource usage request message comprises a first user identifier of the terminal device;
   replacing, by the resource control network element, the first user identifier with a second user identifier, and sending an authorization request message to an authorization server by using a network exposure function (NEF), wherein the authorization request message comprises the second user identifier that is based on an encrypted first user identifier generated from encrypting a first user identifier of the terminal device;
   receiving, by the resource control network element by using the NEF, an authorization response message sent by the authorization server, wherein the authorization response message comprises an authorization result that is obtained by the authorization server by performing authorization based on the second user identifier and the resource usage request message; and
   allocating, by the resource control network element, a network resource to the terminal device based on the authorization result, and sending a resource allocation response message to the terminal device.

2. The method according to claim 1, wherein the replacing, by the resource control network element, the first user identifier with a second user identifier comprises:
   performing, by the resource control network element, identity verification on the first user identifier, and after determining that the identity verification on the first user identifier succeeds, replacing the first user identifier with the second user identifier.

3. The method according to claim 2, wherein the performing, by the resource control network element, identity verification on the first user identifier comprises:
   determining, by the resource control network element, that the identity verification on the first user identifier succeeds, when determining that the first user identifier is a subscriber permanent identifier, a subscriber temporary identity, or a third-party user identifier.

4. The method according to claim 1, wherein, before the replacing, by the resource control network element, the first user identifier with a second user identifier, the method comprises:
   generating the second user identifier by encrypting a public key of the resource control network element, the first user identifier, and a preset parameter by using an asymmetric encryption algorithm;
   generating the second user identifier by encrypting a public key of the resource control network element, the first user identifier, and a preset parameter by using a symmetric encryption algorithm;
   generating the second user identifier by encrypting the first user identifier and a preset parameter by using a hash encryption algorithm; or
   generating the second user identifier by encrypting a nonce of the resource control network element, the first user identifier, and a preset parameter by using a hash encryption algorithm.

5. The method according to claim 1, wherein, before the replacing, by the resource control network element, the first user identifier with a second user identifier, the method comprises:
   calculating the second user identifier by using the encrypted first user identifier, a preset variable factor, and a preset encryption algorithm, and
   wherein generating the encrypted first user identifier comprises:
   encrypting a public key of the resource control network element, the first user identifier, and a preset parameter by using an asymmetric encryption algorithm;
   encrypting a public key of the resource control network element, the first user identifier, and a preset parameter by using a symmetric encryption algorithm;
   encrypting the first user identifier and a preset parameter by using a hash encryption algorithm; or
   encrypting a nonce of the resource control network element, the first user identifier, and a preset parameter by using a hash encryption algorithm.

6. The method according to claim 1, wherein the authorization request message further comprises an application identifier, and the authorization response message comprises the authorization result that is obtained by the authorization server by performing authorization based on the second user identifier, the application identifier, and the resource usage request message.

7. An authorization method, comprising:
   receiving, by a network exposure function (NEF), an authorization request message sent by a resource control network element, wherein the authorization request message comprises a second user identifier that is based on an encrypted first user identifier generated from encrypting a first user identifier of a terminal device;
   sending, by the NEF, the authorization request message to an authorization server, when determining that the authorization request message meets a preset security requirement;
   receiving, by the NEF, an authorization response message that is fed back by the authorization server based on the authorization request message; and
   sending, by the NEF, the authorization response message to the resource control network element, when determining that the authorization response message meets the preset security requirement.

8. The method according to claim 7, wherein the determining, by the NEF, that the authorization request message meets a preset security requirement comprises:
   determining, by the NEF, that the resource control network element is allowed to send the authorization request message; and/or
   determining that message content of the authorization request message meets a preset security policy.

9. The method according to claim 7, wherein the determining, by the NEF, that the authorization response message meets the preset security requirement comprises:

determining, by the NEF, that the authorization response message sent by the authorization server is allowed to be received;
determining that message content of the authorization response message meets a preset security policy; and/or
determining that a destination address of the authorization response message is consistent with a source address of the authorization request message.

10. A resource control network element, comprising:
a transceiver configured to:
  receive a resource usage request message sent by a terminal device, wherein the resource usage request message comprises a first user identifier of the terminal device; and
  send an authorization request message to an authorization server by using a network exposure function (NEF); and
a hardware processor configured to replace the first user identifier with a second user identifier,
wherein the second user identifier is based on an encrypted first user identifier generated from encrypting the first user identifier of the terminal device,
wherein the authorization request message comprises the second user identifier of the terminal device,
wherein the transceiver is further configured to receive, by using the NEF, an authorization response message sent by the authorization server,
wherein the authorization response message comprises an authorization result that is obtained by the authorization server by performing authorization based on the second user identifier and the resource usage request message,
wherein the hardware processor is further configured to allocate a network resource to the terminal device based on the authorization result, and
wherein the transceiver is further configured to send a resource allocation response message to the terminal device.

11. The network element according to claim 10, wherein when replacing the first user identifier with the second user identifier, the hardware processor is further configured to:
  perform identity verification on the first user identifier, and after determining that the identity verification on the first user identifier succeeds, replace the first user identifier with the second user identifier.

12. The network element according to claim 11, wherein when performing the identity verification on the first user identifier, the hardware processor is further configured to:
  determine that the identity verification on the first user identifier succeeds, when determining that the first user identifier is a subscriber permanent identifier, a subscriber temporary identity, or a third-party user identifier.

13. The network element according to claim 10, wherein before replacing the first user identifier with the second user identifier, the hardware processor is further configured to:
  generate the second user identifier by encrypting a public key of the resource control network element, the first user identifier, and a preset parameter by using an asymmetric encryption algorithm;
  generate the second user identifier by encrypting a public key of the resource control network element, the first user identifier, and a preset parameter by using a symmetric encryption algorithm;
  generate the second user identifier by encrypting the first user identifier and a preset parameter by using a hash encryption algorithm; or
  generate the second user identifier by encrypting a nonce of the resource control network element, the first user identifier, and a preset parameter by using a hash encryption algorithm.

14. The network element according to claim 10, wherein before replacing the first user identifier with the second user identifier, the hardware processor is further configured to:
  calculate the second user identifier by using the encrypted first user identifier, a preset variable factor, and a preset encryption algorithm, and
  wherein generating the encrypted first user identifier comprises:
  encrypting a public key of the resource control network element, the first user identifier, and a preset parameter by using an asymmetric encryption algorithm;
  encrypting a public key of the resource control network element, the first user identifier, and a preset parameter by using a symmetric encryption algorithm;
  encrypting the first user identifier and a preset parameter by using a hash encryption algorithm; or
  encrypting a nonce of the resource control network element, the first user identifier, and a preset parameter by using a hash encryption algorithm.

15. The network element according to claim 10, wherein the authorization request message further comprises an application identifier, and the authorization response message comprises the authorization result that is obtained by the authorization server by performing authorization based on the second user identifier, the application identifier, and the resource usage request message.

16. The network element according to claim 10, wherein the authorization request message further comprises a first message authentication code, and the first message authentication code is used by the authorization server to verify security of the authorization request message; and the authorization response message further comprises a second message authentication code, and the second message authentication code is used by the hardware processor to verify security of the authorization response message.

17. The network element according to claim 16, wherein after the transceiver receives, by using the NEF, the authorization response message sent by the authorization server, the transceiver is further configured to:
  send an authorization acknowledgment message to the authorization server by using the NEF, wherein the authorization acknowledgment message comprises a third message authentication code, and the third message authentication code is used by the authorization server to verify security of the authorization acknowledgment message.

18. The network element according to claim 10, wherein before the transceiver sends the authorization request message to the authorization server:
  the transceiver is further configured to receive a subscription data response message of the terminal device, wherein the subscription data response message comprises third-party authorization indication information, and the third-party authorization indication information is used to indicate that third-party authorization needs to be performed on the terminal device; or
  the hardware processor is further configured to determine, according to a local configuration policy, that third-party authorization needs to be performed on the terminal device.

19. The network element according to claim 10, wherein when allocating a network resource to the terminal device based on the authorization result, the hardware processor is specifically further configured to:
- if the authorization result is that the terminal device is allowed to use a network resource, allocate a requested network resource to the terminal device; or
- if the authorization result is that the terminal device is not allowed to use a network resource, refuse to allocate a requested network resource to the terminal device.

\* \* \* \* \*